United States Patent [19]

Nishimura et al.

[11] Patent Number: 5,301,126
[45] Date of Patent: Apr. 5, 1994

[54] METHOD OF PROCESSING A SIGNAL FROM A THERMAL TYPE FLOW SENSOR

[75] Inventors: Yukinobu Nishimura; Nobutake Taniguchi; Setsuhiro Shimomura, all of Himeji; Kouji Tanimoto, Amagasaki, all of Japan

[73] Assignee: Mitsubishi Denki Kabushiki Kaisha, Tokyo, Japan

[21] Appl. No.: 849,812

[22] Filed: Mar. 11, 1992

Related U.S. Application Data

[63] Continuation of Ser. No. 479,821, Feb. 13, 1990, abandoned.

[30] Foreign Application Priority Data

| | | |
|---|---|---|
| Feb. 14, 1989 [JP] | Japan | 1-34391 |
| Mar. 24, 1989 [JP] | Japan | 1-72617 |
| Mar. 24, 1989 [JP] | Japan | 1-72618 |
| Apr. 28, 1989 [JP] | Japan | 1-111109 |
| Apr. 28, 1989 [JP] | Japan | 1-111110 |

[51] Int. Cl.$^5$ .................. G06F 15/20; G01N 11/04; F02D 41/30
[52] U.S. Cl. .................. 364/510; 364/557; 364/571.03; 364/431.05; 123/391
[58] Field of Search .................. 364/510, 557, 571.01, 364/571.02, 571.03, 571.05, 431.05, 571.07; 374/54; 340/606; 73/3, 861.01, 202.5, 204.11, 204.18; 123/391, 340

[56] References Cited

U.S. PATENT DOCUMENTS

| | | | |
|---|---|---|---|
| 4,404,638 | 9/1983 | Yada et al. | 364/510 |
| 4,485,449 | 11/1984 | Knauss | 364/510 |
| 4,683,858 | 8/1987 | Sato et al. | 364/431.05 |
| 4,706,196 | 11/1987 | Muramatsu et al. | 364/431.05 |
| 4,736,302 | 4/1988 | Kinugawa et al. | 364/431.05 |
| 4,773,023 | 9/1988 | Giardina | 364/510 |
| 4,807,151 | 2/1989 | Citron | 364/557 |
| 4,814,997 | 3/1989 | Matsumura et al. | 364/431.05 |
| 4,829,449 | 5/1989 | Polesnak | 364/510 |
| 4,848,301 | 7/1989 | Hashimoto et al. | 364/510 |
| 4,881,185 | 11/1989 | Murakami et al. | 364/557 |
| 4,892,072 | 1/1990 | Miwa et al. | 364/431.05 X |
| 4,987,549 | 1/1991 | Gee | 364/571.01 |
| 5,021,959 | 6/1991 | Jundt et al. | 364/431.05 |

FOREIGN PATENT DOCUMENTS 134919 of 1988 Japan.

Primary Examiner—Thomas G. Black
Assistant Examiner—Michael Zanelli
Attorney, Agent, or Firm—Sughrue, Mion, Zinn, Macpeak & Seas

[57] ABSTRACT

A method of processing signal for a thermal type flow sensor having a temperature dependence resistance employing platinum and the like and a holding member made of alumina for holding it so as to compensate for response delay when fluid flow is changed, in which, when the fluid flow is maintained in a stationary state, the so-called equilibrium state, by steps of setting in advance the relation between a flow related value which changes according to flow change and a first operational value showing the temperature characteristic of the holding member which changes according to flow so as to make the flow related value as a parameter, calculating the first operational value from the flow related value when flow is detected in accordance with the predetermined relation, comparing the calculated first operational value with the second operational value which is set in relation with the first operational value, correcting the second operational value so that it approximates the first operational value according to the compared result, calculating a compensating factor by a predetermined operational formula with the calculated first operational value and the corrected second operational value, and compensating the compensating factor by multiplying it by the detected flow.

11 Claims, 23 Drawing Sheets

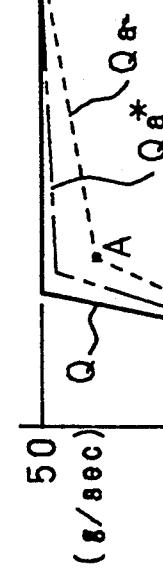
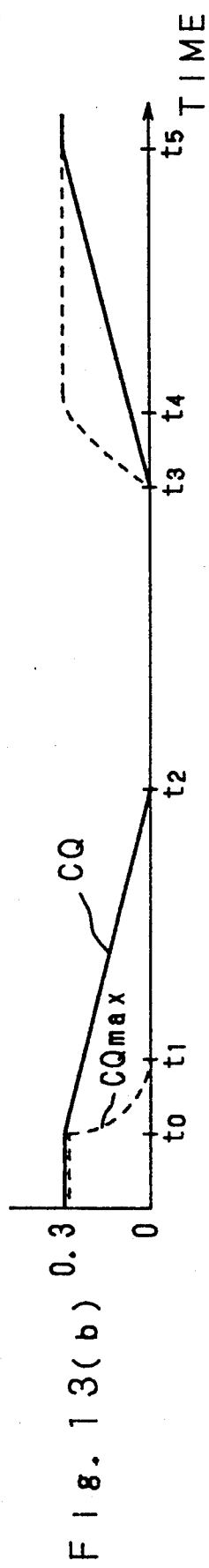
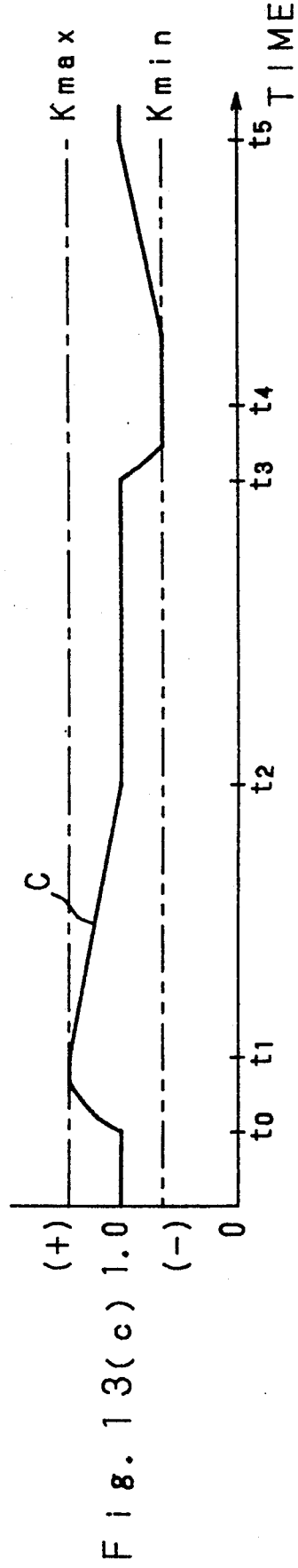
Fig. 13(a)
Fig. 13(b)
Fig. 13(c)

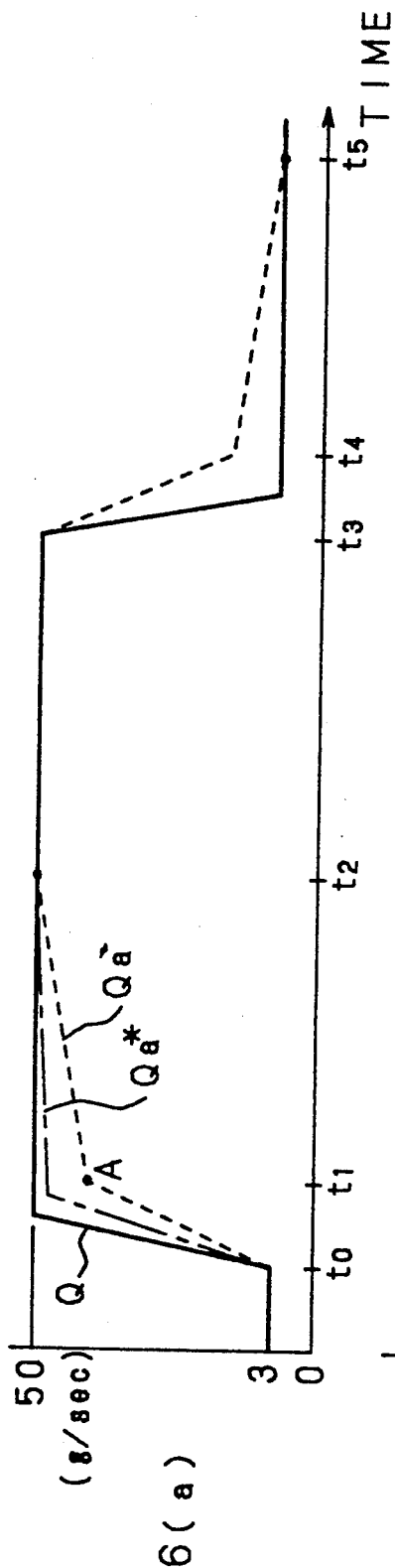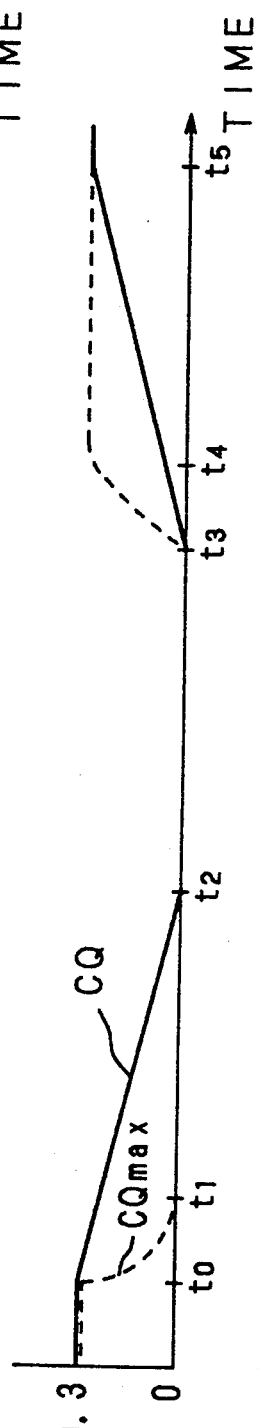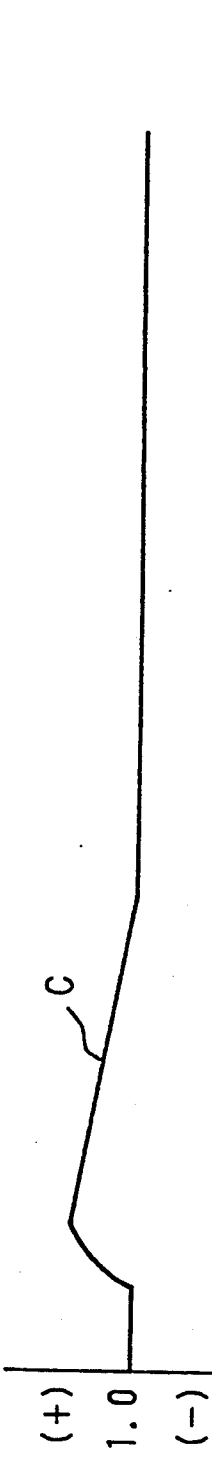
Fig. 16(a)
Fig. 16(b)
Fig. 16(c)

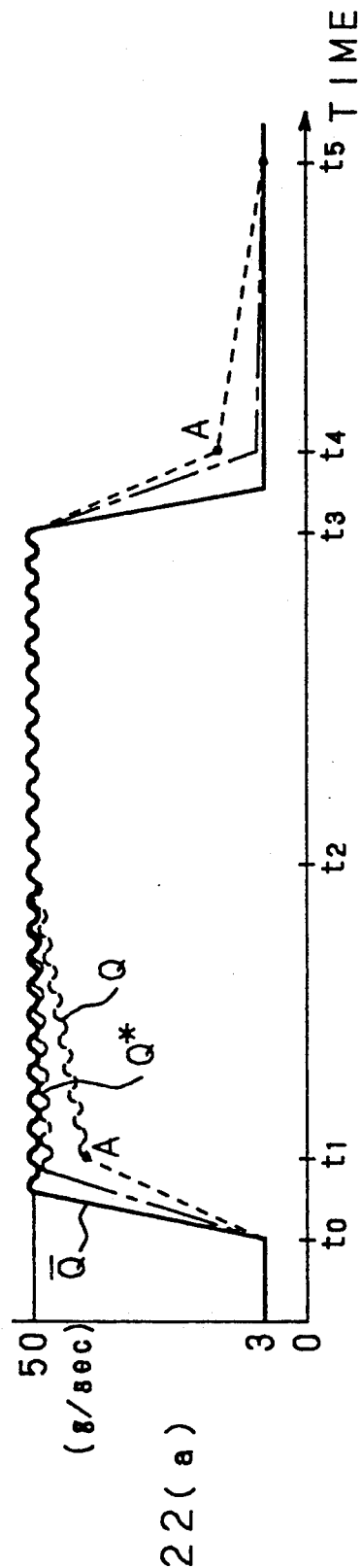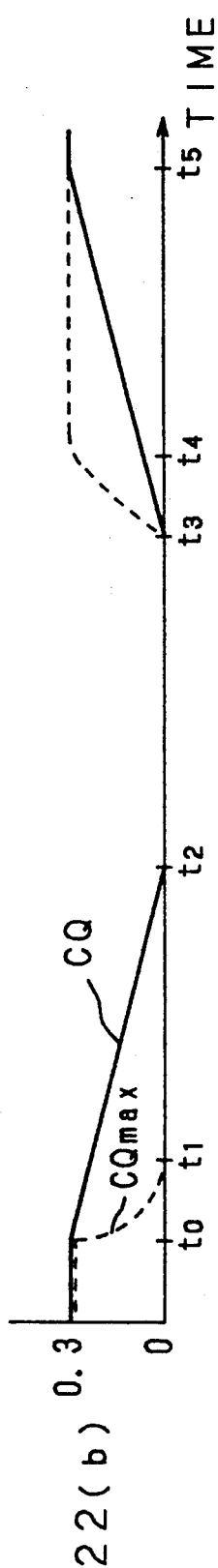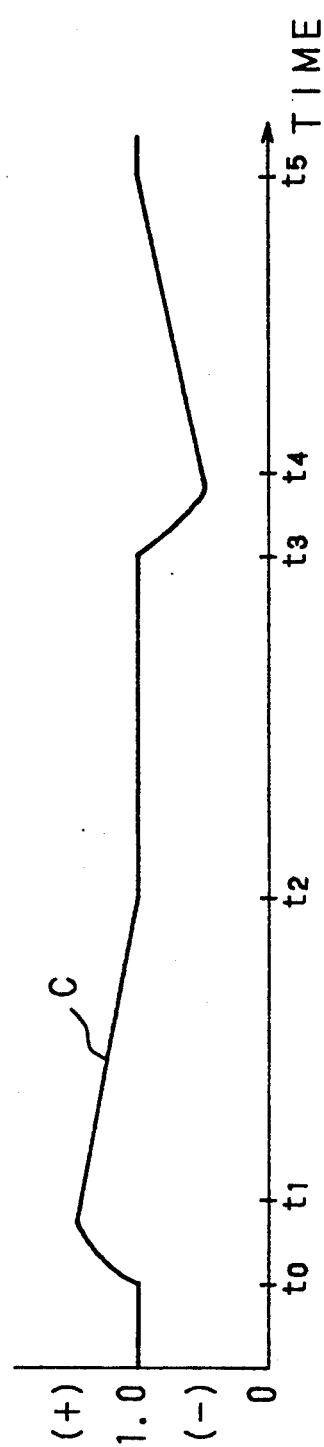
Fig. 22(a)
Fig. 22(b)
Fig. 22(c)

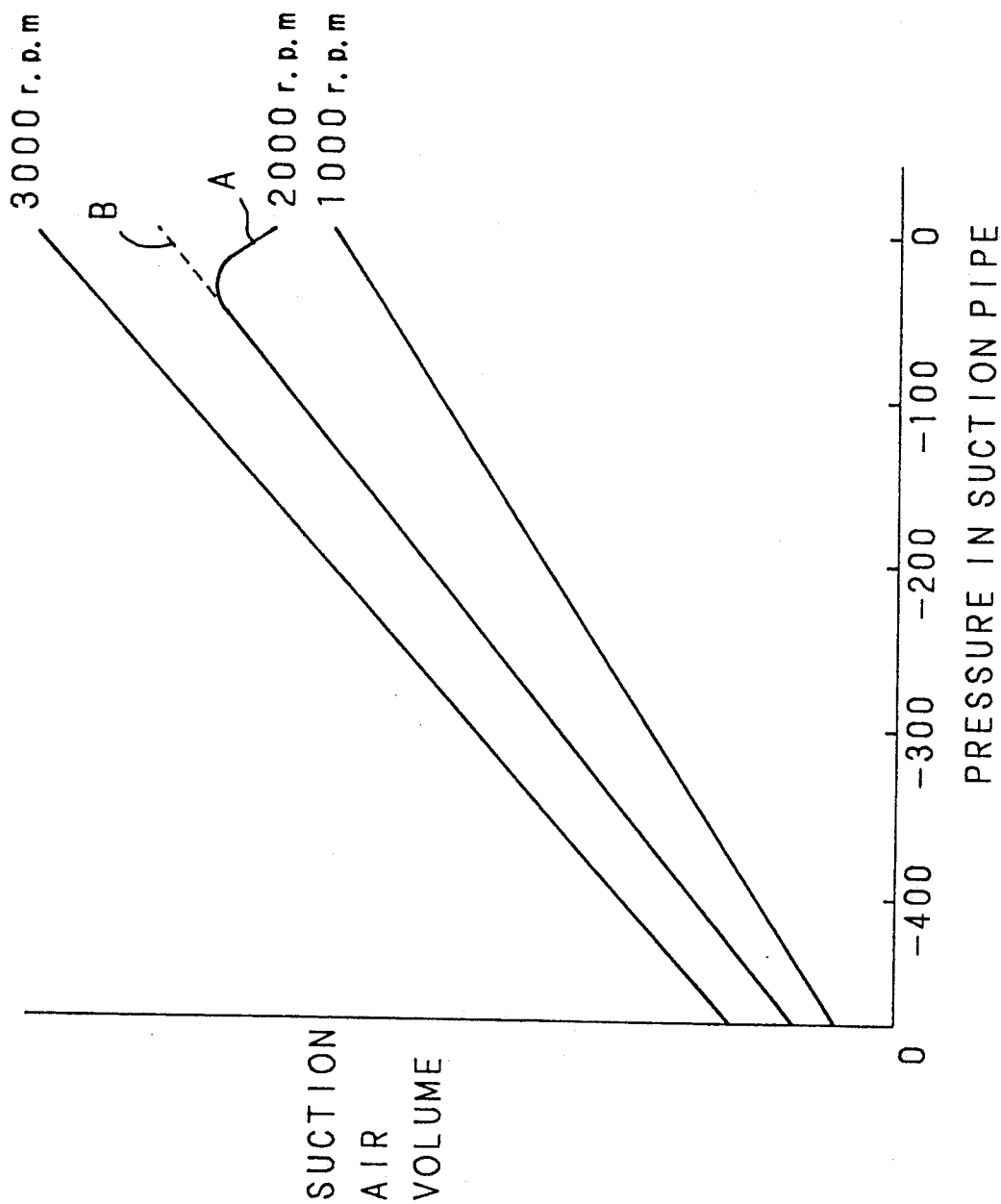

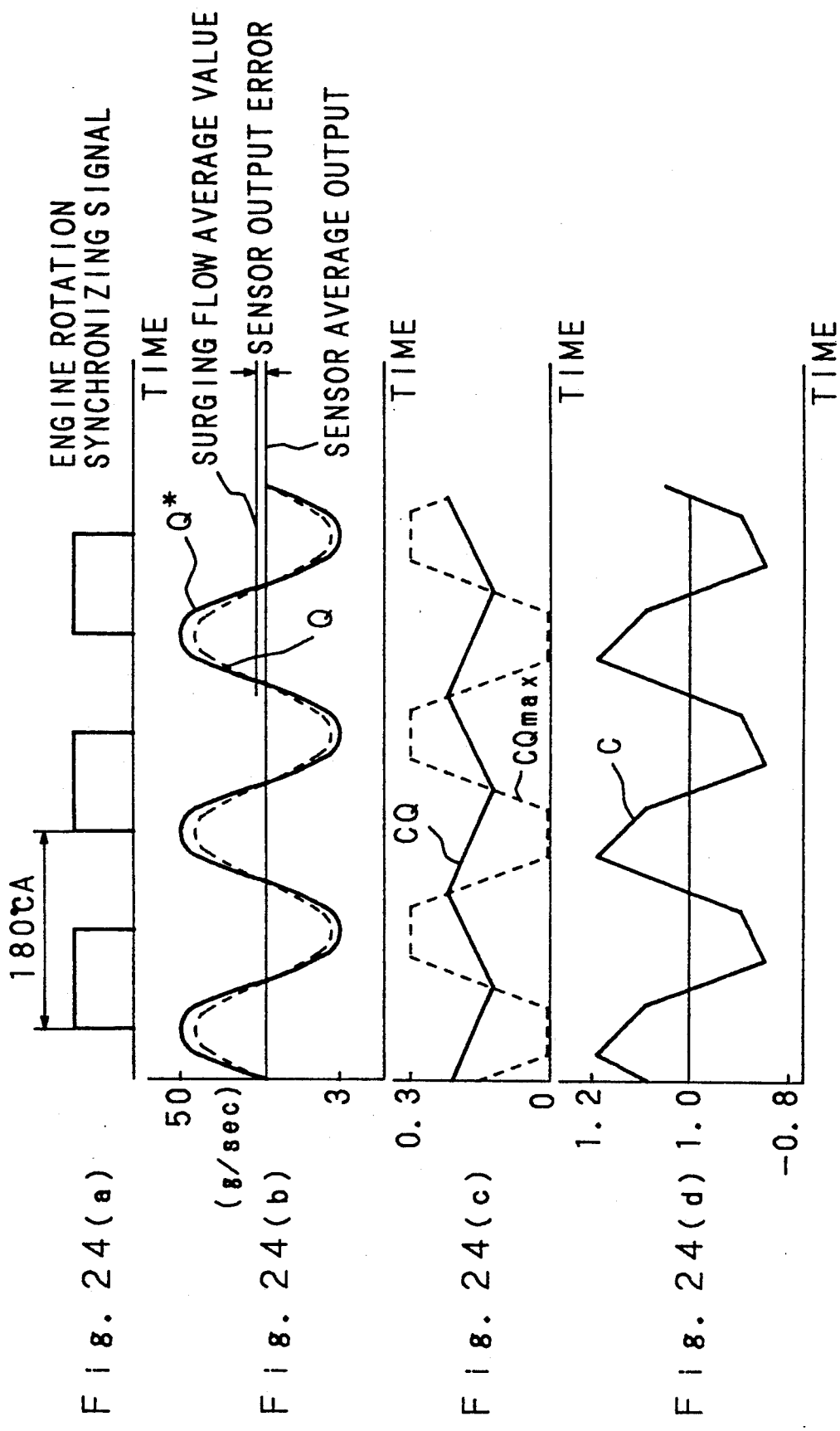

METHOD OF PROCESSING A SIGNAL FROM A THERMAL TYPE FLOW SENSOR

This is a continuation of application Ser. No. 07/479,821 filed Feb. 13, 1990 now abandoned.

BACKGROUND OF THE INVENTION

1. Field of the Invention

The present invention relates to a method of processing a signal from a thermal type flow sensor for detecting fluid flow, and more particularly, to a method of processing the signal to improve response characteristic when the flow is changed.

2. Description of Related Art

Heretofore, for a thermal type flow sensor, there has been well known a thermal type air flow sensor for detecting intake air flow in an internal combustion engine, and for a typical example of that type, there is well known a hot wire type air flow sensor which controls an electric current to be sent to a platinum wire so as to fix the temperature of the platinum wire in an air intake passage and which receives an air flow signal in accordance with the value of the electric current. In addition, for a more inexpensive hot wire type air flow sensor, a thermal type air flow sensor, in which platinum is deposited on an alumina substance or film as a replacement for the platinum wire, has been eliciting considerable interest.

In those thermal type air flow sensors, since air flow is measured by detecting the electric current sent to a temperature dependent resistance and controlled to fix the temperature of the resistance, when air flow to be measured is changed by the resistance of the temperature dependent resistance and by the thermal conduction and heat reserve of the resistance's holding member, it is well known that output response is so delayed as to produce error in its detection characteristic. For example, in a hot wire type air flow sensor in which a platinum wire is nearly stretched in an air intake passage, there is a comparatively little effect caused by the holding member; however, both in a hot wire type air flow sensor in which a platinum wire is coiled up around a ceramic bobbin and also in the thermal type air flow sensor in which platinum is deposited on an alumina substrate or film as described above, there is considerably great effect of the above-noted heat conduction and heat reserve upon the ceramics or the film which are holding member.

FIG. 1 illustrates this type of thermal type air flow sensor, in which reference numeral 11 designates a housing in the form of a pipe through which air flows, the direction of flowing air being shown by the arrow. Reference character $R_H$ designating the temperature dependent resistance for detecting air flow, is formed by printing or depositing platinum in a meander form onto an alumina substrate 14 as shown in FIG. 2, is then trimmed, and is arranged in the air passage with other resistances $R_K$ and $R_M$. Resistances $R_H$, $R_M$, $R_K$, $R_1$, and $R_2$ are arranged in a well-known bridge circuit to form a resistance value detecting unit, and those resistances form a closed loop with a differential amplifier 12 so that $R_H$ can be controlled to have a fixed temperature or fixed resistance value. Consequently, the electric current sent to $R_H$ is determined according to the air flow and an output voltage 13 can be obtained according to the product of the value of the electric current and the resistance value of $R_M$.

Next will be described below the response delay which occurs in such a thermal type air flow sensor 1 when air flow is changed. FIG. 3 is an illustration of the response in the thermal type air flow sensor when air flow is changed gradually, and the response characteristic is shown substantially equal to the line having a bending point shown as A. In the figure, the ordinate designates the elapsed time after the change of air flow in the staircase, and the abscissa designates the change rate of air flow. Time lag to the point A is caused mainly by the delay of the thermal response of the platinum resistance $R_H$ and the response of the circuit, and the deviation of the value at the point A from a desired value and the time until the value is converged from the point A to the desired value are mainly caused by heat conduction and heat reserve of the alumina substrate 14 which is a holding member for the platinum resistance $R_H$. FIG. 4 is an illustration to show the above-mentioned operation, showing temperature distribution of the alumina substrate 14 with the horizontal axis designating distance which is based upon the position of the platinum resistance $R_H$ to the alumina substrate 14. The temperature around the platinum resistance $R_H$ is controlled to be fixed in a temperature high enough compared with the air temperature by the aforementioned circuit. Then, heat being generated in the platinum resistance $R_H$ is emitted into the air, while the heat is transmitted and reserved into the alumina substrate 14 from the platinum resistance $R_H$. In order to compensate for this heat loss, the closed loop controls the electric current to the platinum resistance $R_H$. Then, the output of the thermal type air flow sensor 1 to a predetermined air flow results in including the heat conduction and heat reserve to the alumina substrate 14, however, there can be obtained a characteristic under a state that heat of the alumina substrate 14 is in equilibrium, that is, an accurate flow characteristic under a stationary state. On the other hand, where air flow is changed, such thermal equilibrium as aforementioned can not be obtained here, then, error in the flow characteristic will be generated. In FIG. 4, a line 11 designates the temperature distribution when there is small air flow, so there is a line 12 when there is large air flow. In the figure, the line 12 is shown in the position below the line 11 because the cooling effect of the alumina substrate 14 depends on flowing air flow. When air flow is gradually changed from small to large, the temperature distribution is finally to be the line 12, however, at an initial stage, the air flow is corresponding to the line 12 but has the temperature distribution of the line 11, and a supply current to the platinum resistance $R_H$, that is, output of the thermal type air flow sensor 1 becomes smaller than the substantial output thereof. To be concrete, when any change in air flow is occurs, there is generated initial flow error corresponding to the difference between the temperature distribution corresponding to the air flow before the change and the temperature distribution corresponding to the air flow after the change, and the time error until the temperature distribution becomes stationary to the air flow after the change will be maintained while gradually decreasing. The degree of the initial flow error and time error, in such a thermal type air flow sensor 1 as shown in FIG. 1, depends greatly on heat conduction and heat reserve of the alumina substrate 14 which is a holding member. And even in a fuel injection system of an internal combustion engine which is manufactured in consideration of the acreage of platinum resistance $R_H$ and the thickness of the alumina substrate 14 and the like so as to have responsiveness and durability to be practically usable, there is still the maximum 30 percent of the initial flow error and about 500 msec of the time error continuing, and it is substantially difficult to permit this response delay in controlling fuel of the internal combustion engine.

In order to improve such disadvantage as described above, as shown in Japanese Patent Application Laid-Open No. 63-134919, for example, a method of improving the response characteristic to the air flow change in the thermal type air flow sensor by devising its constitution is well known. The thermal type air flow sensor of prior art as described above, however, has problems in that its constitution is too complicated to be easily manufactured and its costs are prohibitive.

SUMMARY OF THE INVENTION

The foregoing problems are solved in accordance with the present invention, and the primary object of the invention is to provide a method of a processing signal in which a response delay of flow detection occurs because of thermal response delay when flow is changed in a thermal type flow sensor being provided with a temperature-dependent resistance and a holding member, the response delay can be controlled to be compensated for with a compensating factor according to the thermal response delay.

Another object of the invention is to provide a method of processing signal which can prevent overcompensation by providing maximum and minimum limits in the compensating factor so as to ensure measurement of flow with great accuracy.

A further object of the invention is to provide a method of processing a signal by which an adverse effect owing to flow shortage will not be occurred by compensating the response delay of the flow detection only when fluid flow increases.

The still further object of the invention is to provide a method of processing a signal by which a stable flow detection can be performed by not compensating the response delay when variation of flow is in a surging state.

The another still further object of the invention is to provide a method of processing a signal by which deficiency being caused by the surging flow can be removed by compensating operation of a flow detected at an instant by the thermal type flow sensor.

The above and further objects and features of the invention will more fully be apparent from the following detailed description with accompanying drawings.

BRIEF DESCRIPTION OF THE DRAWINGS

FIGS. 13(a)-13(c) are graphs for showing change in the first and the second operational values when air flow is rapidly changed in the second embodiment;

FIGS. 16(a)-16(c) are graphs for showing change in the first and the second operational values when air flow is rapidly changed in the third embodiment;

FIGS. 22(a)-22(c) are graphs for showing change in the first and the second operational values when air flow is rapidly changed in the fifth embodiment;

FIG. 23 is a graph showing the relation between intake air flow and pressure in suction pipe; and FIGS. 24(a)-24(c) are time charts for showing the relation among flow, the first operational value, the second operational value, and a flow compensating value when surging flow is occurred.

DESCRIPTION OF THE PREFERRED EMBODIMENTS

Figure 1:
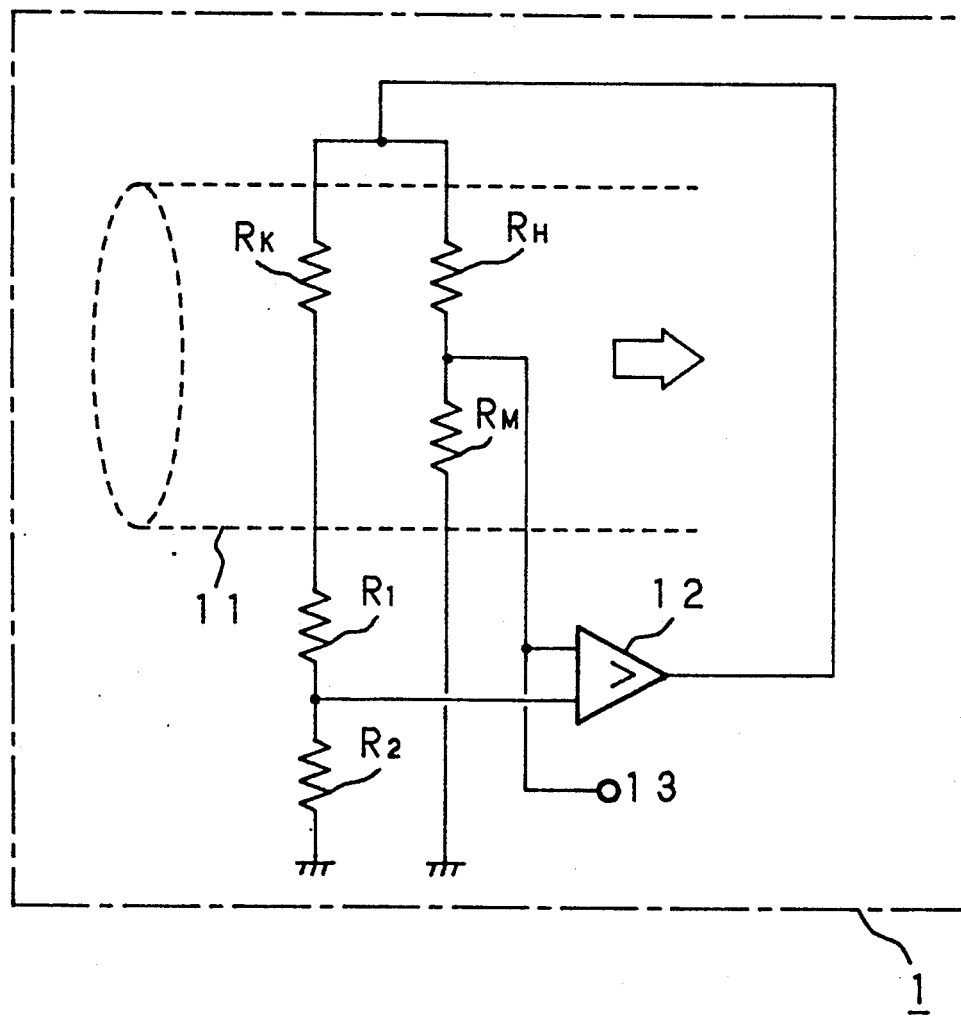
FIG. 1 is a block diagram illustrating a thermal type air flow sensor in an internal combustion engine.
Figure 5:
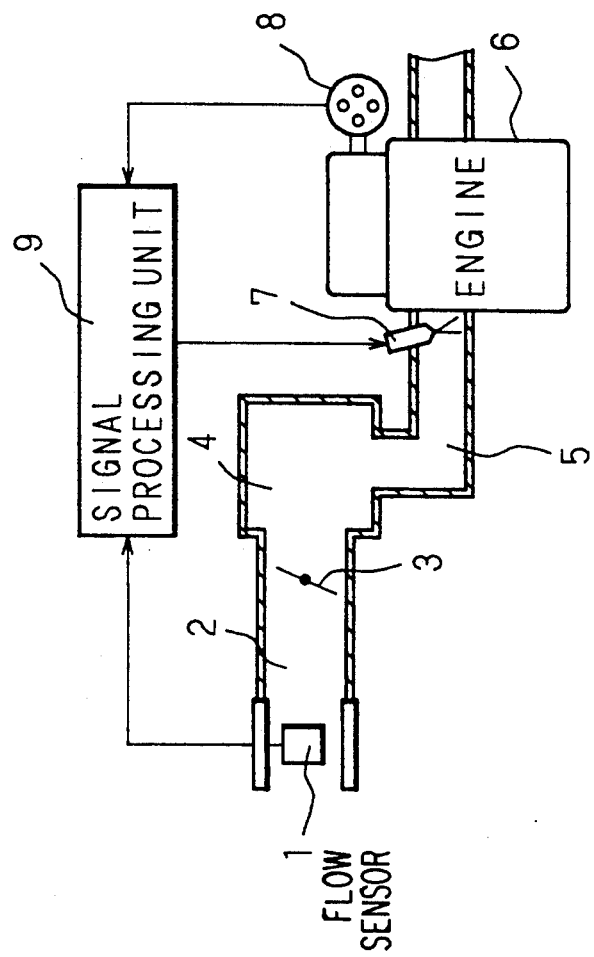
FIG. 5 is an illustration showing basic arrangement of a fuel injection system in an internal combustion engine being employed in the present invention.
Figure 6:
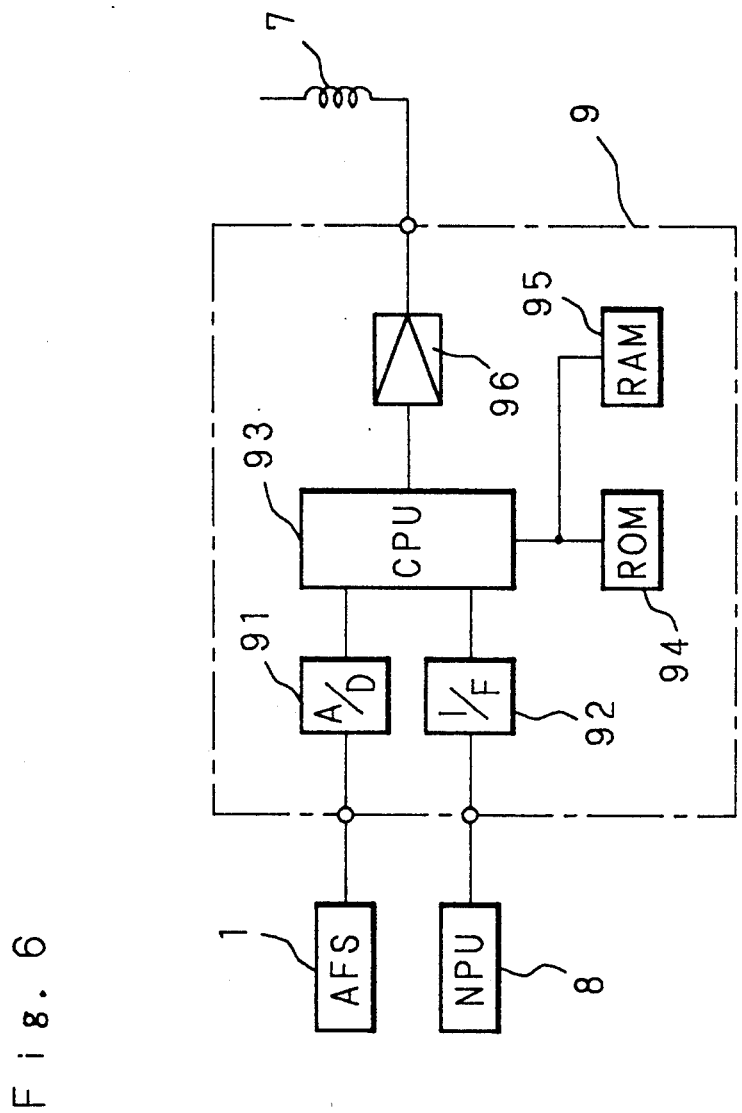
FIG. 6 is a block diagram showing a signal processing unit of the fuel injection system.

Now, embodiments of a method of processing a signal for a thermal type flow sensor of the present invention will be described below with reference to the accompanying drawings. Here will be described a method of processing signal for thermal type flow sensor being employed in a fuel injection system of an engine. In FIG. 5, reference numeral 1 designates a thermal type air flow sensor shown in FIG. 1, and said thermal type air flow sensor is housed at a position which is slightly inside of an air intake opening of an air intake passage 2. The air being intook in said air intake passage 2 is taken into a throttle valve 3 being provided at the downstream side of the thermal type air flow sensor 1 so that the volume of the intook air can be adjusted, and then, the air is supplied to each cylinder through a surge tank 4 for absorbing surging flow of the intook air which is provided at the downstream side of the throttle valve 3 and an intake manifold 5 for distributing the intook air to each cylinder in an engine 6. An injector 7 for injecting fuel is mounted to the intake manifold 5 in every cylinder, and a crank angle sensor 8 for detecting rotational position of a crank shaft is provided in a distributor mounted to a cam shaft (not shown) in the engine 6. An air flow signal from the air flow sensor 1 and an engine speed signal from the crank angle sensor 8 are inputted to a signal processing unit 9, where in response to those signals and other signals from various types of sensors and the like (not shown), compensating operation is performed so as to control the injection pulse width of the injector 7. As shown in FIG. 6, the signal processing unit 9 is comprised of an analogue to digital converter 91 for converting an output voltage signal from the thermal type air flow sensor 1 into a digital signal, a digital interface 92 for corrugate-fairing of an output signal from the crank angle sensor 8, a central processing unit (CPU) 93 for performing operational processing in response to outputs from those elements 91 and 92, a ROM 94 in which a program and data such as data CQmax which will be described later are stored, a RAM 95 for temporarily storing data such as data CQ which will be described later, and a driving circuit 96 for generating an output signal. The basic method of operational processing is that such compensating operation of air flow as will be described later is performed with the analogue to digital value of the air flow sensor 1 and the engine speed signal from the crank angle sensor 8, and then, in response to those signals and operational values, the fuel injection pulse width is calculated by a well-known method so as to control the injector 7 by the driving circuit 96.

The thermal type air flow sensor 1 being employed in such a fuel injection system, as has been described above, necessarily has a response delay because of the heat conduction and heat reserve characteristics of the alumina substrate 14 being provided therein, then, it is necessary to provide such processing as to improve its responsiveness by the present invention.

Next will be described below one embodiment of a method of processing a signal of this invention with reference to FIG. 7 through FIG. 10.

Figure 7:
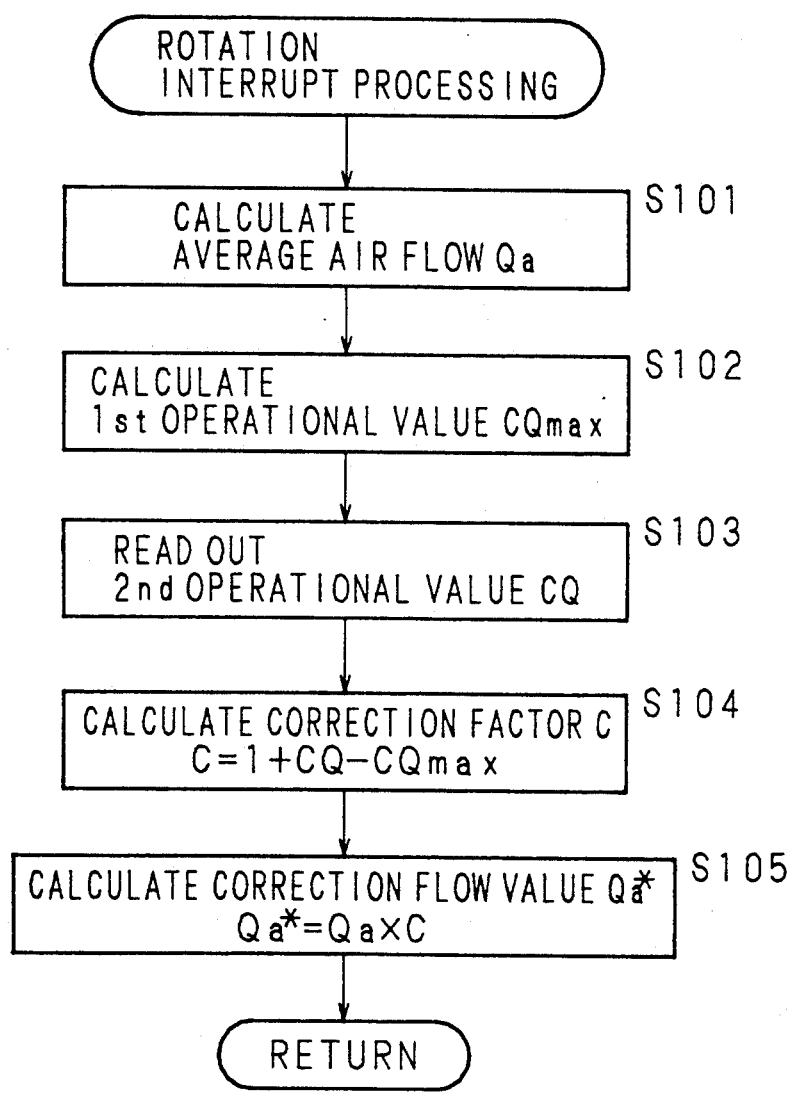
FIG. 7 is a flow chart showing a method of processing signal of the present invention.
Figure 8:
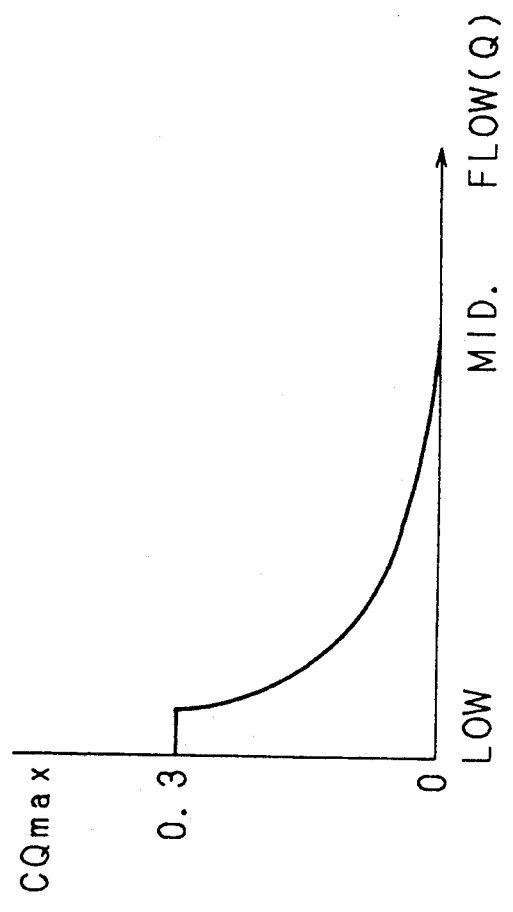
FIG. 8 is a graph showing the relation between a first operational value and flow.

First, in FIG. 7, in the signal processing unit 9, according to flow characteristic which has been measured in advance from the output voltage of the air flow sensor 1 which is analogue-to-digital converted in a predetermined cycle, the flow corresponding to the flow characteristic is calculated. And at Step 101, when an interrupt signal from the crank angle sensor 8 is inputted (where four-cylinder engine, at every 30 msec at rotation of 1000 rpm), according to the accumulated value and accumulated times of flow during this time, average air flow Qa between engine speed signals is operated. Then, at Step 102, referred to a table which has been set in advance, there is calculated data CQmax to the average air flow Qa when the air flow sensor 1 is in a stationary state, that is, in a thermally equilibrium state. When a practical air flow measurement area being used in an internal combustion engine is within several g/sec to 100 g/sec, as shown in FIG. 8, this table shows 0.3 in the low flow area and 0 in further than the middle flow area, and as the air flow Qa increases, the table shows decreasing value in the low through the middle flow area.

This first operational value CQmax is thought to designate the temperature characteristic of the alumina substrate 14 which changes corresponding to the air flow Qa.

Figure 9:
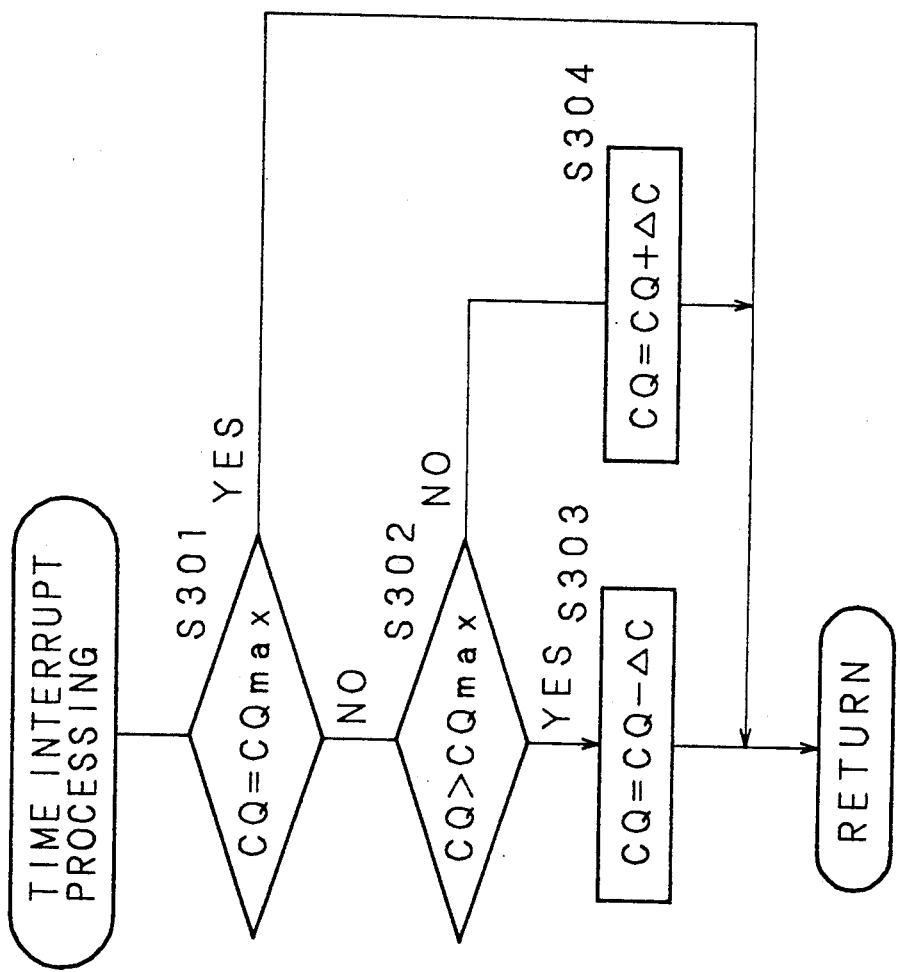
FIG. 9 is a flowchart showing operational procedure of a second operational value.

Then, at Step 103, the RAM 95 reads out the second operational value CQ which has been operated by a processing routine shown in FIG. 9. This second operational value CQ is set by the next routine. In other words, when there is inputted a time interrupt signal being set to be 100 ms for example, at Step 301, it is identified whether the new value CQmax corresponding to the air flow Qa is equal to the value just before that or not, and where both values are equal to each other, the air flow is assumed to be in the equilibrium state and the value CQmax is held as the second operational value CQ. On the other hand, where those values are not equal to each other, at Step 302, it is identified whether the value CQ is larger than the first operational value CQmax or not, and where the value CQ ia larger, a predetermined value $\Delta C$ is subtracted from the value CQ at Step 303, and where the value CQ is smaller, the predetermined value $\Delta C$ is added to the value CQ at Step 304. As described above, the operational processing is performed so that the second operational value CQ can be more approximate to the first operational value CQmax and, then, the second operational value CQ corresponding to the larger-or-smaller relation to the first operational value CQmax can be stored in the RAM 95.

At Step 104 in FIG. 7, a compensating factor C is calculated from the first operational value CQmax and the second operational value CQ, and at Step 105, by multiplying this compensating factor C by the average air flow Qa, a compensated air flow value Qa* is calculated.

Figure 2:
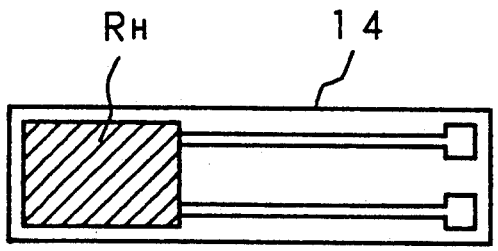
FIG. 2 is a plan view illustrating the thermal type air flow sensor in the internal combustion engine.
Figure 10:
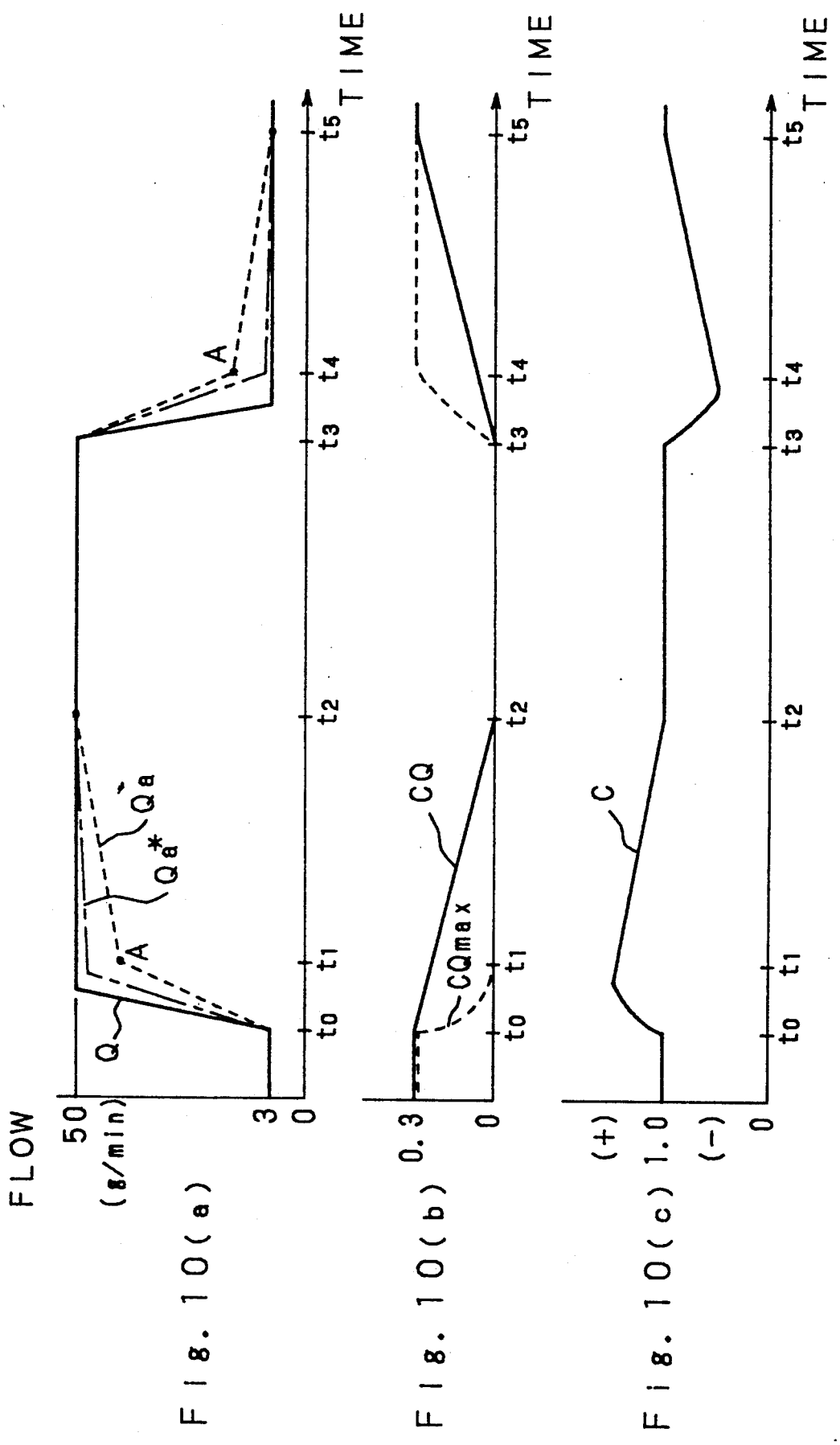
FIGS. 10(a)-10(c) are graphs for showing change in the first and the second operational values when air flow is rapidly changed.

FIG. 10 is a time chart showing the case where air flow is rapidly increased or decreased in air flow sensor 1, and at the time t0, the throttle valve 3 is rapidly opened and the opened state (large flow state) is maintained, and then at the time t3, the throttle valve 3 is rapidly brought into the closed state. The full line in FIG. 10(a) designates a change in actual intake air flow Q, and the broken line designates a change in the intake air flow Qa shown by the air flow sensor 1. In other words, after the output Qa from the air flow sensor 1 is changed according to the response characteristic of the sensor itself, at A point (time t1), its responsiveness is reduced according to the temperature characteristic of the alumina substrate 14 as shown in FIG. 2, and there is occurred time lag until the time t2 at which a signal showing the actual intake air flow is obtained. The time being spent at the time t1 through t2 varies from several hundreds msec to 1 sec, which is considerably longer compared with 50 msec being spent at the time t0 to t1. In response to the output Qa of the air flow sensor 1, the first operational value CQmax changes as shown in the broken line in FIG. 10(b), and according to the operation shown in FIG. 9, the second operational value CQ also changes as shown in the full line in FIG. 10(b). Consequently, the compensating factor C is varied according to the deviation of the first operational value CQmax and the second operational value CQ as shown in FIG. 10(c), and by multiplying this compensating factor C by the output Qa from the air flow sensor 1, there can be obtained a signal showing the intake air flow Qa* approximate to the actual intake air flow Q.

As described above, in this invention, it is arranged that the first operational value CQmax being generated in the equilibrium state of the output from the air flow sensor 1 is stored in advance, and there is formed the second operational value CQ which changes according to the change of the first operational value CQmax and the larger-or-smaller relation to the first operational value CQmax, while according to those operational values, the compensating factor C is calculated and compensated by multiplying it by the output from the air flow sensor 1, thereby, there are advantages that thermal effect caused by the holding member which holds the temperature-dependent resistance can be eliminated and that the response characteristic when air flow is detected can be improved.

Next will be described below the second embodiment of the present invention. In the first embodiment which has been described above, there is provided no limit in the compensating factor C, however, in this embodiment, there is provided maximum and minimum limits in order to prevent over-compensation of the operation.

Now a method of processing signal which is the second embodiment of the invention will be described with reference to FIG. 11 through FIG. 13.

Figure 11:
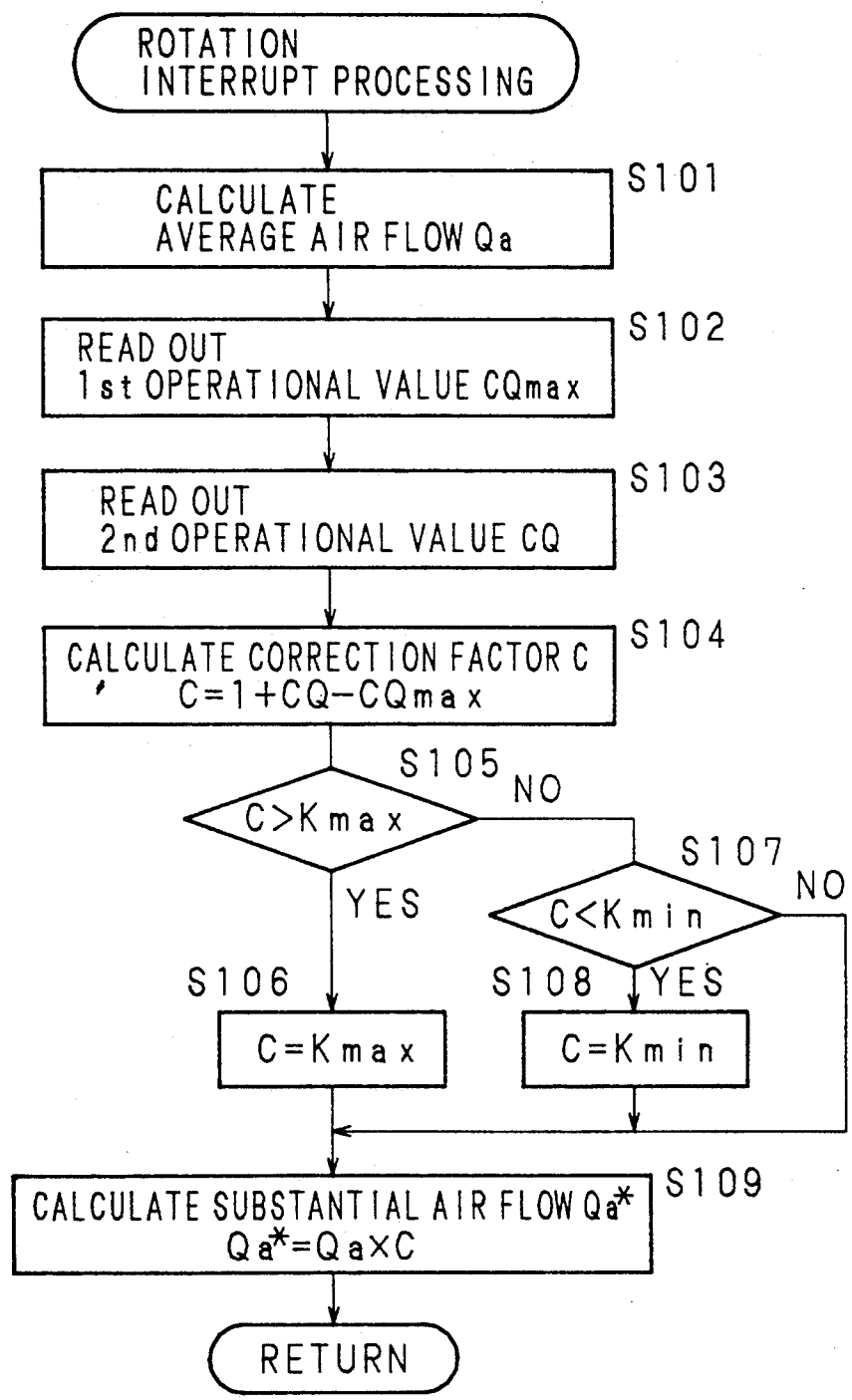
FIG. 11 is a flowchart showing a method of processing signal in the second embodiment.

In FIG. 11, according to the flow characteristic which has been measured from the value of output voltage of the air flow sensor 1 which is analog-to-digital converted in a predetermined cycle, the signal processing unit 9 calculates the flow corresponding to the flow characteristic, and when an interrupt signal from the crank angle sensor 8 is inputted thereto at Step 101 (where four-cylinder engine, at every 30 msec at rotation of 1000 rpm), according to the accumulated value and accumulated times of the flow during this time, the average air flow Qa between engine speed signals is operated. Then, at Step 102, referred to the table which has been set in advance as shown in FIG. 8 similarly to the first embodiment, there is calculated data CQmax to the average air flow Qa when the air flow sensor 1 is in the stationary state, that is, in the thermally equilibrium state.

The first operational value CQmax is thought to designate the temperature characteristic of the alumina substrate 14 which changes corresponding to the air flow Qa.

Figure 12:
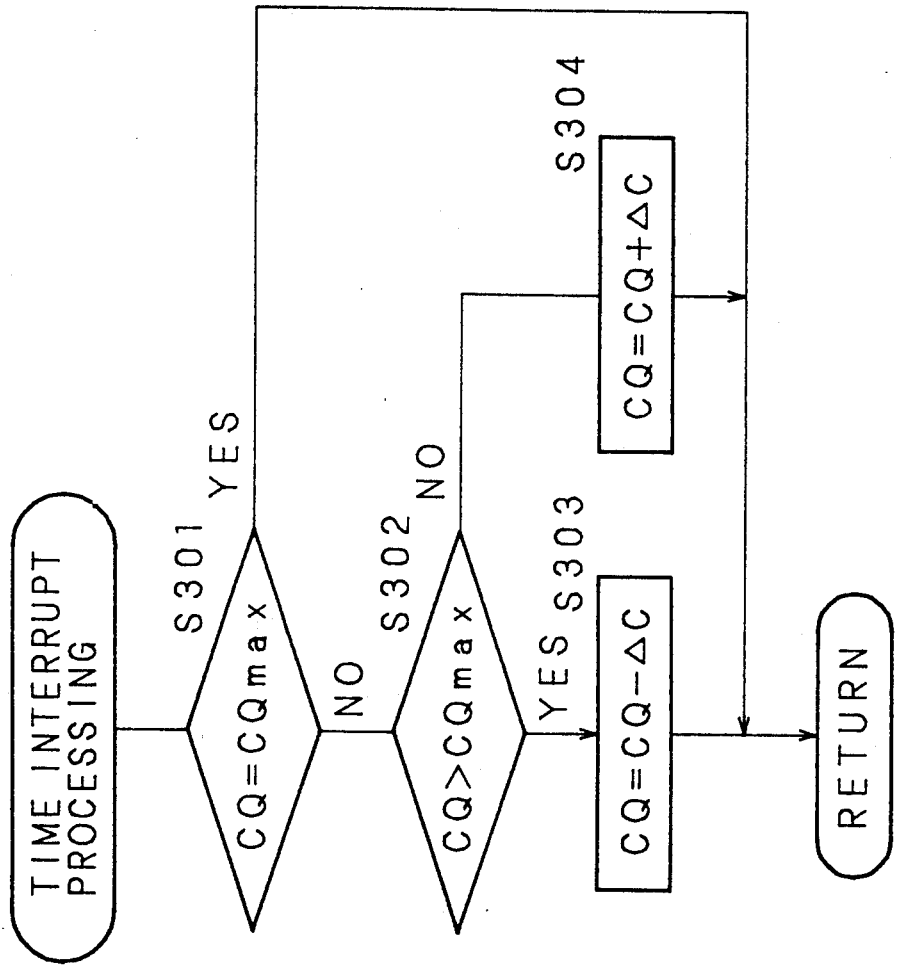
FIG. 12 is a flowchart showing operational procedure of the second operational value in the second embodiment.

At Step 103, the RAM 95 reads out the second operational value CQ which has been operated by the processing routine shown in FIG. 12. This second operational value CQ is set by the next routine. In other words, in FIG. 12, after the time interrupt signal being set to be 100 msec for example is inputted, at Step 301, it is identified whether the new value CQmax corresponding to the average air flow Qa is equal to the value just before that or not, and where both values are equal to each other, the air flow is assumed to be in the equilibrium state and, then, the value CQmax is held as the second operational value CQ. On the other hand, where those values are not equal to each other, at Step 302, it is identified whether the value CQ is larger than the first operational value CQmax or not, and where the value CQ is larger, the predetermined value ΔC is subtracted from the value CQ at Step 303, and where it is smaller, the predetermined value ΔC is added to the value CQ at Step 304. As can be seen above, the operational processing is performed so that the second operational value CQ can be more approximate to the first operational value CQmax, and the second operational value CQ corresponding to the larger-or-smaller relation to the first operational value CQmax can be stored in the RAM 95.

Then, at Step 104 in FIG. 11, the compensating factor C is calculated by the first operational value CQmax and the second operational value CQ, and at Step 105, it is identified whether or not this compensating factor C is larger than a predetermined maximum value Kmax, and where it is larger, the compensating factor C is set to be the maximum value Kmax at step 106. On the other hand, where the compensating factor C is smaller than the maximum value Kmax, it is identified whether or not the compensating factor C is smaller than a minimum value Kmin or not at Step 107, and where it is smaller, the compensating factor C is set to be the minimum value Kmin at Step 180. As described above, the compensating factor C is limited to the value between the maximum value Kmax and the minimum value Kmin, and by multiplying the compensating factor C by the average air flow Qa, the substantial air flow Qa* is calculated at Step 109.

FIG. 13 is a time chart showing the case where air flow is rapidly increased or decreased in the air flow sensor 1, and at the time t0, the throttle valve 3 is rapidly opened and its flow state (large flow state) is maintained, and then at the time t3, the throttle valve 3 is rapidly brought into the closed state. The full line in FIG. 13(a) shows change of the actual intake air flow Q and the broken line shows change of the intake air flow Qa shown by the air flow sensor 1. In other words, after the output Qa of the air flow sensor 1 is changed according to the response characteristic of the sensor itself, at point A (time t1), the responsiveness is reduced according to the temperature characteristic of the alumina substrate 14 as shown in FIG. 2, which results in a time lag until the time t2 at which a signal showing the actual air flow is obtained. Time being spent at the time t1 to t2 ranges from several hundreds msec to 1 sec, which is considerably longer than 50 msec being spent between time and to t1. In response to the output Qa from the air flow sensor 1, the first operational value CQmax changes as shown in the broken line in FIG. 13(b), and according to the operation shown in FIG. 12, the second operational value CQ also changes as shown in the full line in FIG. 13(b). As a result, the compensating factor C is varied according to the deviation of the first operational value CQmax and the second operational value CQ as shown in FIG. 13(c), and by multiplying this compensating factor C by the output Qa of the air flow sensor 1, there can be obtained a signal showing the intake air flow Qa* being approximate to the actual intake air flow Q.

In such air flow sensor 1, there is a possibility that approximate error in a thermal response model occurs or the effect of overchannelling in the internal combustion engine can not be avoided. Then, if such compensating operation as described above is performed in the sensor, there can be seen the case where the flow value after the compensation should become considerably large. In this embodiment, however, at Steps 105 and 106, it is identified whether or not the value of the compensating factor C is within the maximum value Kmax and the minimum value Kmin, and where it is not within those values, the compensating factor C is set to be the maximum value Kmax or the minimum value Kmin in order to prevent over-compensation of the operation.

As can be seen from the above description, in this embodiment, the first operational value CQmax being generated in the equilibrium state of the output of the air flow sensor 1 has been stored in advance, and there is formed the second operational value CQ which changes according to the change of the first operational value CQmax and the larger-or-smaller relation to the first operational value CQmax, while the compensating factor C is calculated according to those operational values. In addition, the compensating factor C is adapted to have limits of the maximum value Kmax or the minimum value Kmin so as to be compensated by multiplying the compensating factor C by the output from the air flow sensor 1, then, there are advantages that thermal effect caused by the holding member 5 which holds the resistance of temperature dependency can be eliminated, that the response characteristic when the air flow is detected can be improved, and that overcompensation of the operation can be avoided.

In the second embodiment, there is arranged that the first and the second operational values CQmax and CQ are set to be within 0.3 through 0 and that the compensating factor C is calculated by the formula (1+CQ−CQmax). However, in this embodiment, there can be arranged that the first and the second operational values CQmax and CQ are set to be the values within 30 through 0 which show their flow values respectively, and the difference (CQ−CQmax) in those values is added or subtracted to/from the average air flow Qa, which can give the equal effect. Then, it is needless to say that the value of the difference (CQ−CQmax) has been limited to the predetermined maximum value Kmax and minimum value Kmin.

Next will be described below a method of processing signal which is the third embodiment of this invention with reference to FIG. 14 through FIG. 16.

Figure 14:
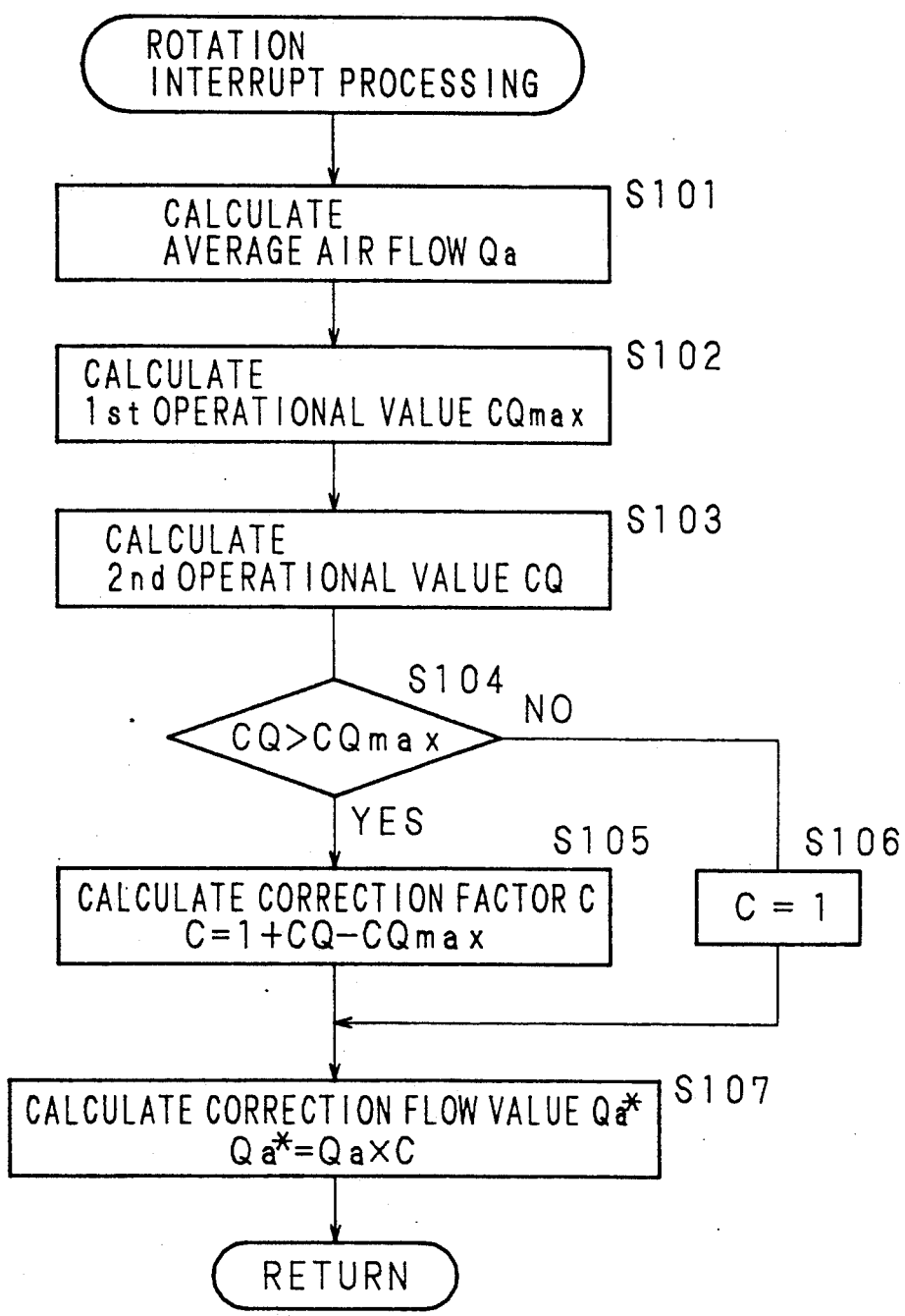
FIG. 14 is a flow chart showing a method of processing signal in the third embodiment.

In FIG. 14, according to the flow characteristic which has been measured in advance from the value of output voltage of the air flow sensor 1 which is analogue-to-digital converted in a predetermined cycle, the signal processing unit 9 calculates the flow corresponding to the flow characteristic, and then at Step 101, when an interrupt signal from the crank angle sensor 8 is inputted thereto (where four-cylinder engine, at every 30 msec at rotation of 1000 rpm), the average air flow Qa between the engine speed signals is operated according to the accumulated value and the accumulated times of the flow during this time. Then, at Step 102, referred to the table which has been set in advance as shown in FIG. 8, there is calculated the data CQmax to the average air flow Qa when the air flow sensor 1 is in the stationary state, that is, in the thermally equilibrium state.

This first operational value CQmax is thought to designate the temperature characteristic of the alumina substrate 14 which changes corresponding to the air flow Qa.

Figure 15:
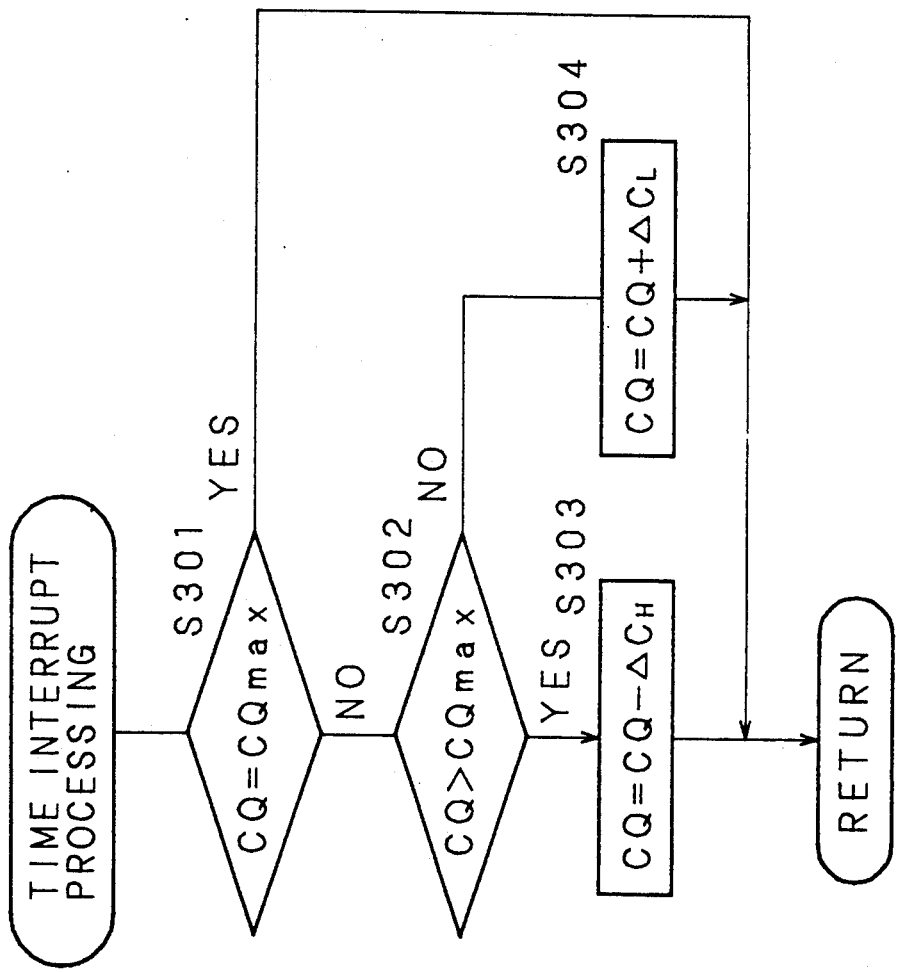
FIG. 15 is a flowchart showing operational procedure of the second operational value in the third embodiment.

Then at Step 103, the RAM 95 reads out the second operational value CQ which has been operated by a processing routine shown in FIG. 15. And this second operational value CQ is set by the next routine. In other words, in the figure, when the time interrupt signal which has been set to be 100 msec, for example, is inputted, at Step 301, it is identified whether or not the new value CQmax corresponding to the air flow Qa is equal to the value just before that or not, and where both values are equal to each other, the air flow is assumed to be in the equilibrium state and the value CQmax is held as the second operational value CQ. On the other hand, where those values are not equal to each other, at Step 302, it is identified whether or not the value CQ is larger than the first operational value CQmax, and where the value CQ is larger, a predetermined value $\Delta C_H$ is subtracted from the value CQ at Step 303, and where it is smaller, a predetermined value $\Delta C_L$ is added to the value CQ at Step 304. As can be seen from the above description, the operational processing is performed so that the second operational value CQ can be more approximate to the first operational value CQmax in the predetermined cycle, and the second operational value CQ corresponding to the larger-or-smaller relation to the first operational value CQmax can be stored in the RAM 95.

Now at Step 104 in FIG. 14, the first operational value CQmax is compared with the second operational value CQ, and where the second operational value CQ is larger, the flow is varied to increase, and then, according to the first and the second operational values CQmax and CQ, the compensating factor C is operated at Step 105. And where the second operational value CQ is smaller, the flow is varied to decrease, and then, the compensating factor C is set to be 1. Then, at Step 107, the compensated substantial air flow Qa* is calculated by multiplying this compensating factor C by the average air flow Qa.

FIG. 16 is a time chart showing the case where the air flow is rapidly increased or decreased in the air flow sensor 1, and at the time t0, the throttle valve 3 is rapidly opened and the opened state (large flow state) is maintained, and then at the time t3, the throttle valve 3 is rapidly brought into the closed state. The full line in FIG. 16(a) shows change in the actual intake air flow Q, and the broken line shows change in the intake air flow Qa shown by the air flow sensor 1. In other words, after the output Qa of the air flow sensor 1 is changed by the response characteristic of the sensor itself, at point A (time t1), its responsiveness is reduced according to the temperature characteristic of the alumina substrate 14 as shown in FIG. 2, and there is occurred time lag until the time t2 at which a signal showing the actual air flow is obtained. Time spent in the time t1 to t2 ranges from several hundreds msec to 1 sec, which are considerably longer when compared with 50 msec being spent in the time and t1, and the time spent in t3 through t5 is about twice as long as the time being spent in t1 to t2, which results in necessitating considerably longer time. And in response to the output Qa from the air flow sensor 1, the first operational value CQmax changes as shown in the broken line in FIG. 16(b), and according to the operation shown in FIG. 15, the second operational value CQ also changes as shown in the full line in FIG. 16(b). Consequently, the compensating factor C is varied according to the deviation of the first operational value CQmax and the second operational value CQ as shown in FIG. 16(c), and by multiplying this compensating factor C by the output Qa of the air flow sensor 1, there can be obtained a signal Qa* showing the intake air flow being approximate to the actual intake air flow Q.

If this compensating operation is performed when air flow is varied to decrease, the output from the air flow sensor 1 is made to be approximate to the flow, however, there is a possibility that the approximate value should be smaller than the actual air flow Q because of unevenness of the sensor 1 and each parts, and in that case, fuel becomes short and air fuel ratio is to be leaned. Especially where acceleration and deceleration are repeatedly carried out, error being generated then will exert a great effect to occur engine stall. Then, at Step 104, when the flow is varied to decrease, the compensating factor C is set to be 1 so that the compensation is inhibited to prevent over-compensation the operation.

As a result of the inhibition of the compensation, the output Qa from the air flow sensor 1 becomes so much larger than the actual air flow Q that more fuel should be supplied, however, originally the engine is not in a state of driving a vehicle at the time of deceleration, which results in merely making the air fuel ratio to be more or less rich but is not liable to produce any substantial problem.

Now will be described below a method of processing signal of the fourth embodiment of this invention with reference to FIG. 17 through FIG. 19.

Figure 17:
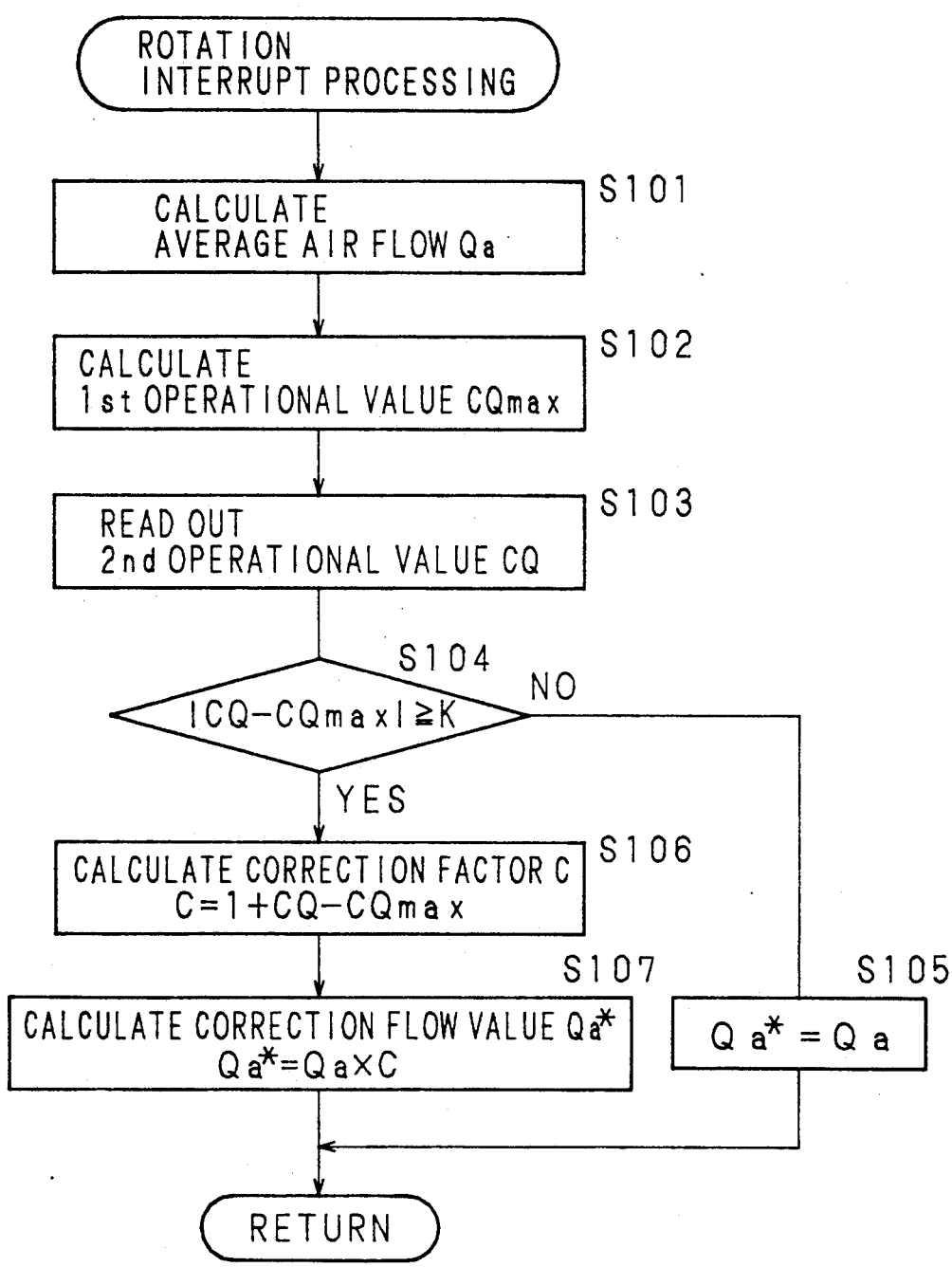
FIG. 17 is a flowchart showing a method of processing signal in the fourth embodiment.

In FIG. 17, according to the flow characteristic which has been measured in advance from the value of output voltage of the air flow sensor 1 which is analogue-to-digital converted in a predetermined cycle, the signal processing unit 9 calculates the flow corresponding to the flow characteristic, and then at Step 101, an interrupt signal from the crank angle sensor 8 is inputted thereto (where four-cylinder engine, at every 30 msec at rotational of 1000 rpm), and the average air flow Qa between engine speed signals is operated according to the accumulated values and accumulated times of the flow during this time. Then at Step 102, referred to the table which has been set in advance as shown in FIG. 8, there is calculated the data CQmax to the average air flow Qa when the air flow sensor 1 is in the stationary state, that is, in the thermally equilibrium state.

This first operational value CQmax is thought to designate the temperature characteristic of the alumina substrate 14 which is changed corresponding to the air flow Qa.

Figure 18:
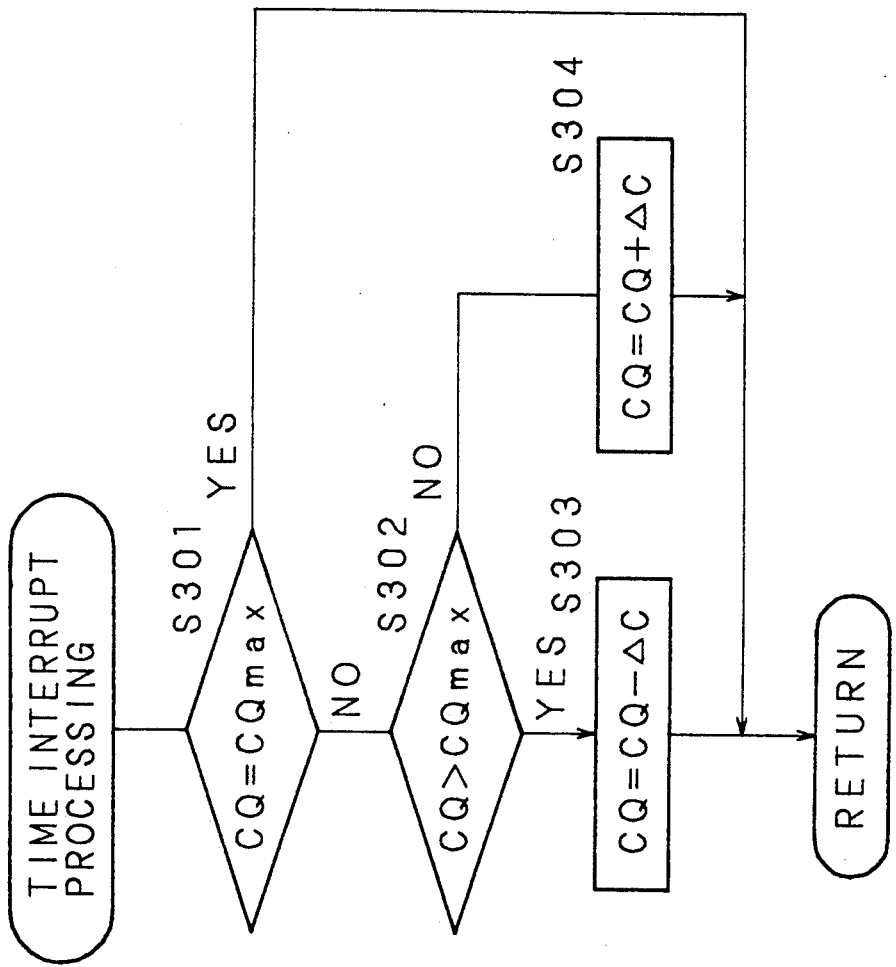
FIG. 18 is a flowchart showing operational procedure of the second operational value in the fourth embodiment.

Then, at Step 103, the RAM 95 reads out the second operational value CQ which has been operated by the processing routine shown in FIG. 18. The second operational value CQ is set by the next routine. In other words, in the figure, where a time interrupt signal being set to be 100 msec, for example, is inputted, it is identified whether or not the new value Cqmax corresponding to the average air Qa is equal to the value just before that at Step 301, and where both values are equal to each other, the flow is assumed to be in the equilibrium state, and the value CQmax is held as the second operational value CQ. And on the other hand, where those values are not equal to each other, it is identified whether the value CQ is larger than the first operational value CQmax or not at Step 302, and where it is larger the predetermined value ΔC is subtracted from the value CQ at Step 303, and where it is smaller, the predetermined value ΔC is added to the value CQ at Step 304. As has been described above, the operational processing is performed so that the second operational value CQ can be more approximate to the first operational value CQmax, and the second operational value CQ corresponding to the larger-or-smaller relation to the first operational value CQmax can be stored in the RAM 95.

Then at Step 104 in FIG. 17, the difference of the absolute values between the first operational value Cqmax and the second operational value CQ, a so-called deviation, is calculated, and it is identified whether or not this deviation is equal to or larger than a predetermined value K. And where the deviation is smaller than the predetermined value K, the average air flow Qa by the output of the air flow sensor 1 is held to be the substantial air flow Qa* at Step 105, and where the deviation is larger, the compensating factor C is calculated at Step 106 and the substantial air flow Qa* is calculated by multiplying the compensating factor C by the average air flow Qa at Step 107.

Figure 3:
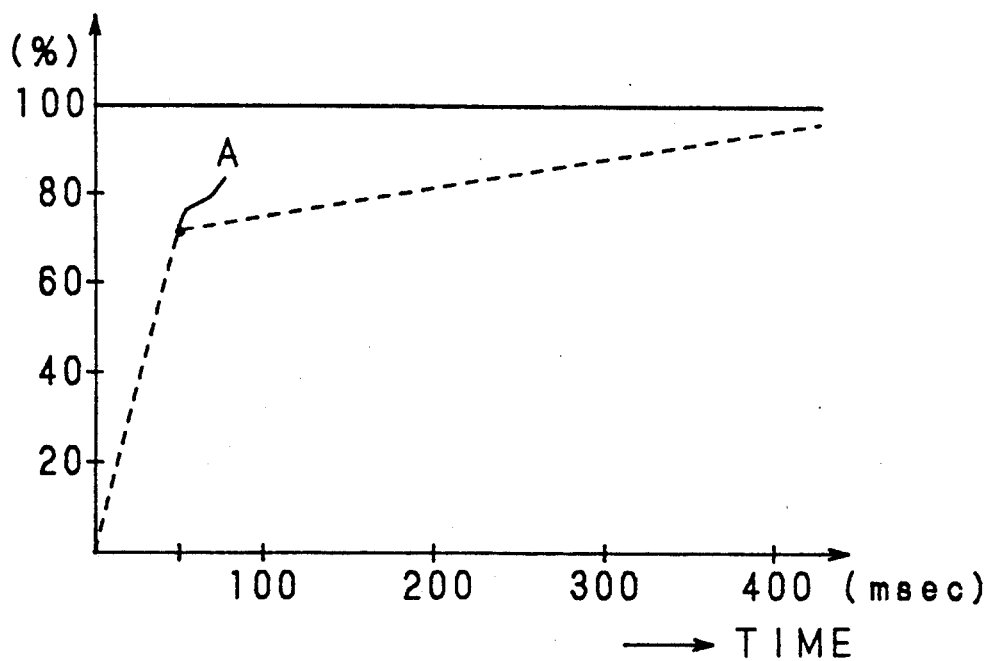
FIG. 3 is an illustration of change rate of air flow in the sensor when air flow is gradually changed.
Figure 4:
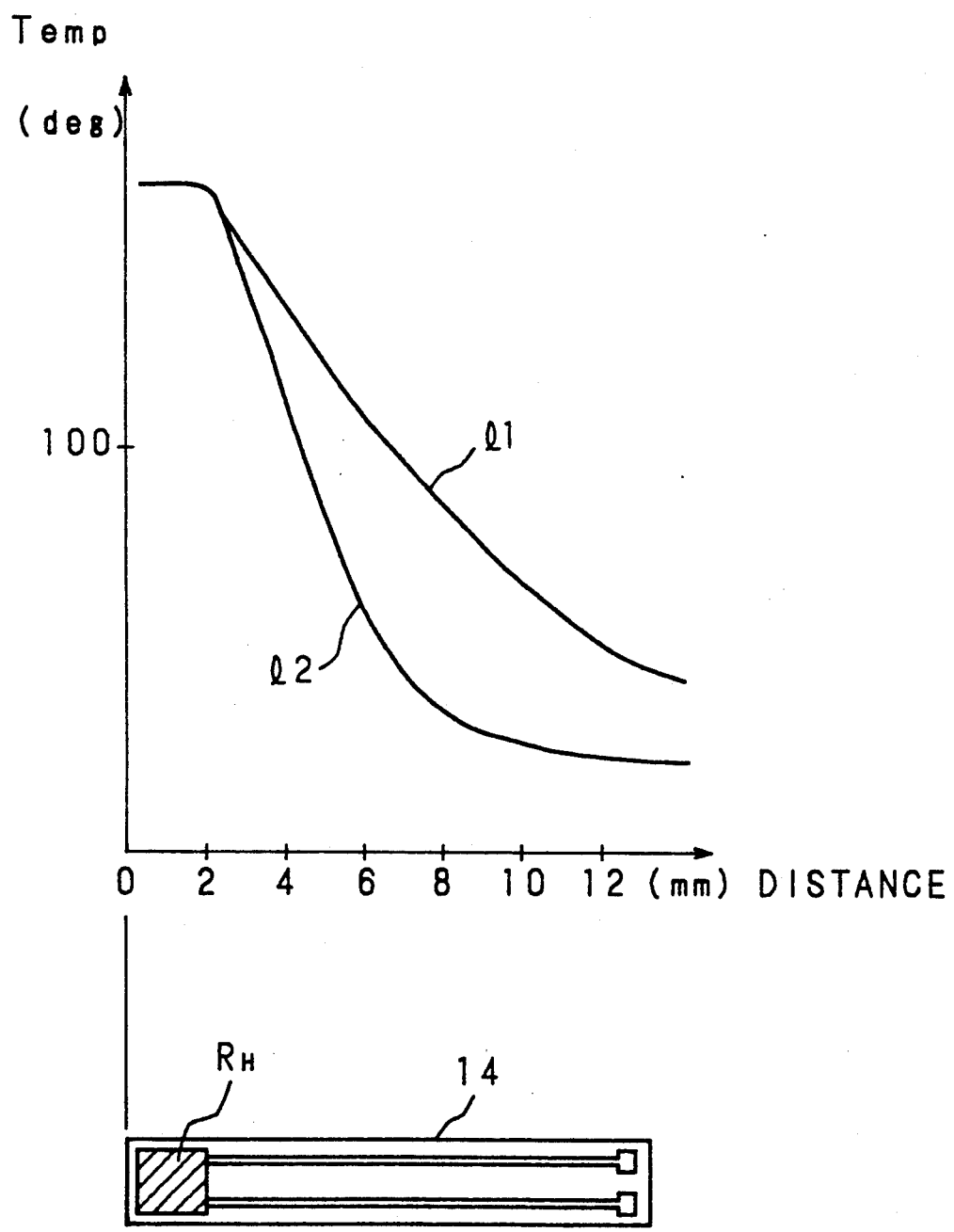
FIG. 4 is an illustration of thermal response delay in the sensor.
Figure 19:
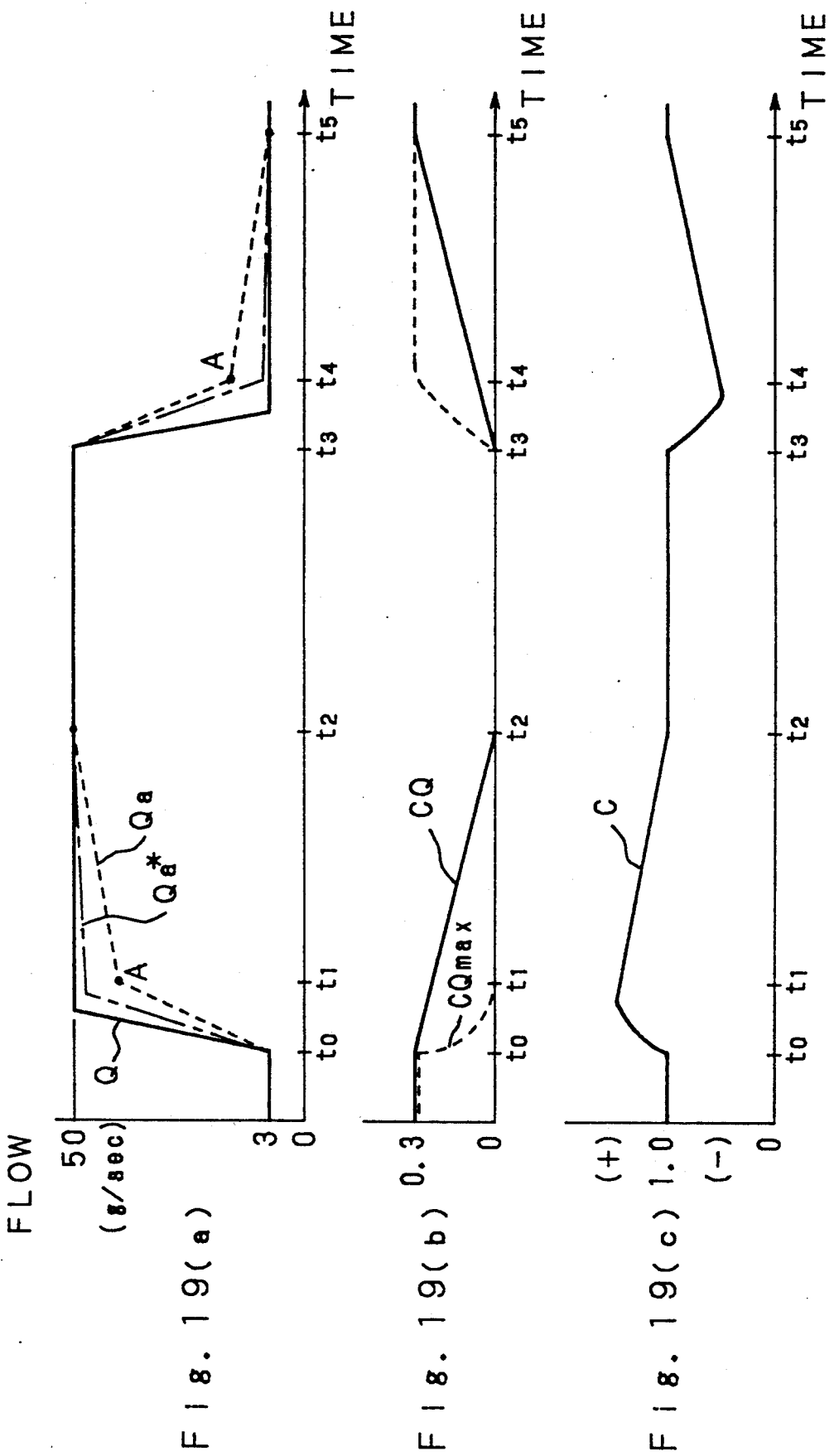
FIGS. 19(a)-19(c) are graphs for showing change in the first and the second operational values when air flow is rapidly changed in the fourth embodiment.

FIG. 19 is a time chart showing the case where the air flow is rapidly increased or decreased in such air flow sensor 1, and at the time t0, the throttle valve 3 is rapidly opened and the opened state (large flow state) is maintained, and then at the time t3, the throttle valve 3 is rapidly brought into the closed state. Then, the full line in FIG. 19(a) shows change of the actual intake air flow Q and the broken line designates change of the intake air flow Qa shown by the air flow sensor 1. In other words, after the output Qa from the air flow sensor 1 is changed according to the response characteristic of the sensor itself, at A point (time t1), its responsiveness is reduced according to the temperature characteristic of the alumina substrate 14 as shown in FIG. 2, and there is occurred time lag until the time t2 at which a signal showing the actual air flow is obtained. Time being spent in the time between t1 and t2 ranges from several hundreds msec to 1 sec, which is considerably longer compared with 50 msec in the time t0 to t1. In response to the output Qa from the air flow sensor 1, the first operational value CQmax changes as shown in the broken line in FIG. 19(b), and according to the operation shown in FIG. 3(b), the second operational value CQ also changes as shown in the full line in FIG. 19(b). Consequently, the compensating factor C is varied according to the deviation of the first operational value CQmax and the second operational value CQ as shown in FIG. 19(c), and by multiplying this compensating factor C by the output Qa from the air flow sensor 1, there can be obtained a signal showing the intake air flow Qa* being approximate to the actual intake air flow Q.

When the internal combustion engine is in a state close to the stationary state in which the intake air flow is varied comparatively slowly, there is a possibility that surging flow should be generated, and in that case, if such compensating operation as described above is carried out, the variation of the flow value after the compensation becomes so great that there exists a possibility that a signal showing the substantial air flow becomes unstable. In order to avoid the instability, in this embodiment, it is identified whether or not the deviation of the first operational value CQmax and the second operational value CQ is more than the predetermined value K or not, and where the deviation is not more than that, namely, in the so-called surging state, the flow is assumed to be stationary and the compensating operation is hindered. Such arrangement in this embodiment as described above will enable to realize the stabilization in output signals.

As can be seen from the above description, in the fourth embodiment, the first operational value CQmax being generated when the output from the air flow sensor 1 is in the equilibrium state is stored in advance, and there is formed the second operational value CQ which is changed according to the change of the first operational value CQmax and the larger-or-smaller relation to the first operational value CQmax, while according to those operational values, the compensating factor C is calculated, and when the deviation of the first operational value CQmax and the second operational value CQ is more than the predetermined value, compensation of the compensating factor C is carried out by multiplying it by the output from the air flow sensor 1, thereby, there are advantages that thermal effect caused by the holding member which holds the resistance of temperature dependency can be eliminated, that the response characteristic when the air flow is detected can be improved as well as stabilization in output signals can be ensured.

Now will be described below a method of processing signal of the fifth embodiment of the invention with reference to FIG. 20 through FIG. 24.

Figure 20:
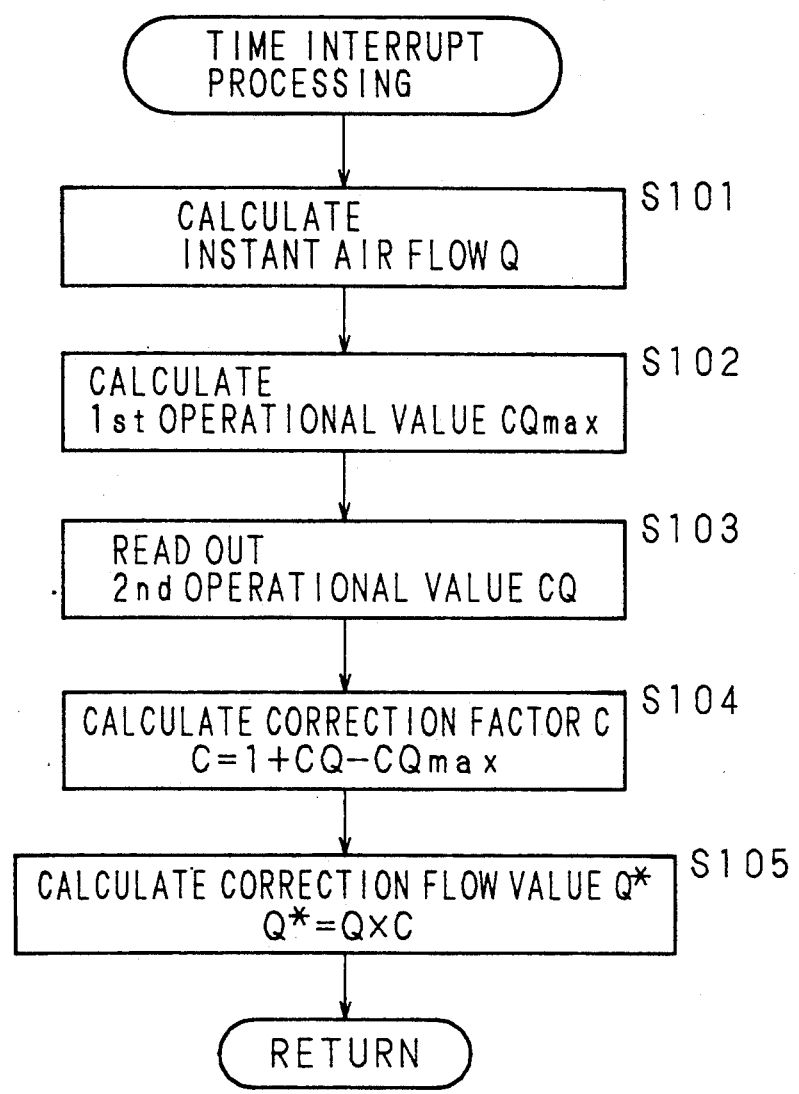
FIG. 20 is a flowchart showing a method of processing signal in the fifth embodiment.

At Step 101 in FIG. 20, the value of output voltage being outputted at an instant from the air flow sensor 1 is analogue-to-digital converted first, and instant air flow Q is calculated according to the voltage-flow characteristic (not shown) which has been measured in advance.

Then at Step 102, referred to the table which has been set in advance as shown in FIG. 8, there is obtained data CQmax to the air flow Q when the air flow sensor 1 is in the stationary state, that is, in the thermally equilibrium state.

This first operational value CQmax is thought to designate the temperature characteristic of the alumina substrate 14 which is changed corresponding to the air flow Q.

Figure 21:
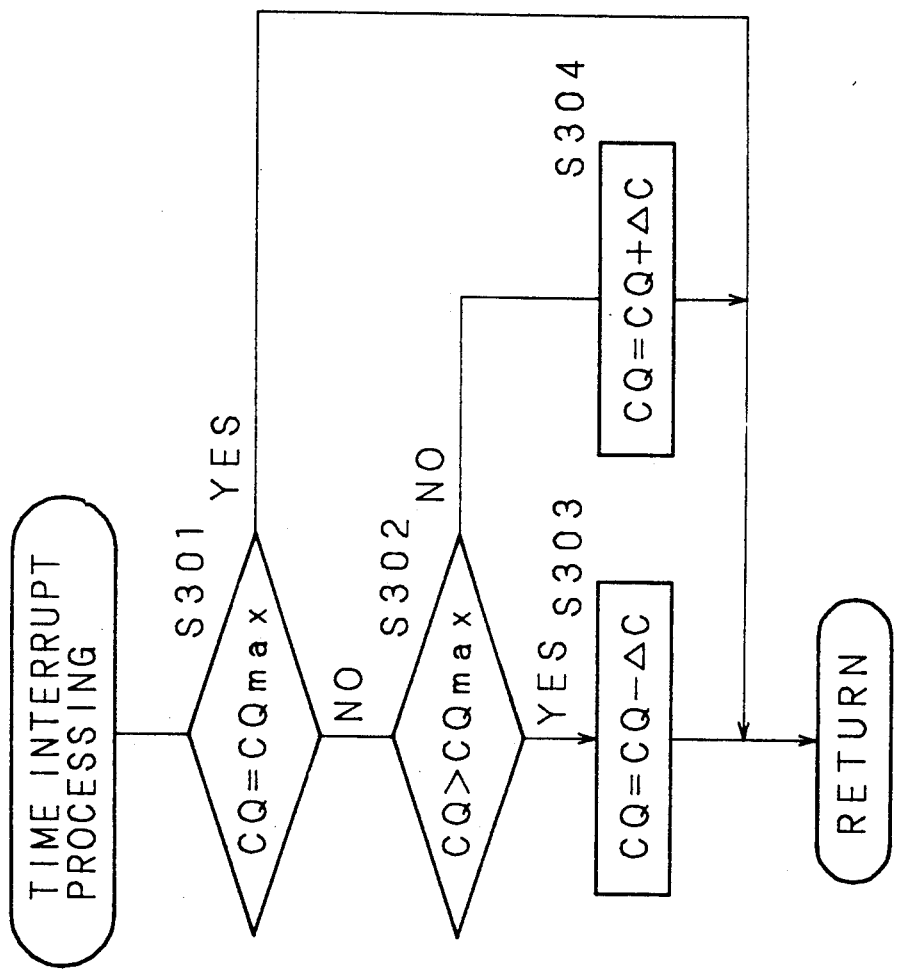
FIG. 21 is a flowchart showing operational procedure of the second operational value in the fifth embodiment.

Then at Step 103, the RAM 95 reads out the second operational value CQ which has been operated by the processing routine shown in FIG. 21. The second operational value CQ is set by the next routine. In other words, in FIG. 21, when a time interrupt signal which has been set to be 100 msec, for example, is inputted in advance, it is identified whether or not the new value CQmax corresponding to the air flow Q is equal to the value just before that at Step 301, and where both values are equal to each other, the flow is assumed to be in the equilibrium state, the value CQmax is held as the second operational value CQ. On the other hand, where those values are not equal, it is identified whether the value CQ is larger than the first operational value CQmax or not at Step 302, and where it is larger, a predetermined value ΔC is subtracted from the value CQ at Step 303, and where it is smaller, the predetermined value ΔC is added to the value CQ at Step 304. As can be seen from the above description, the operational processing is performed so that the second operational value CQ can be more approximate to the first operational value CQmax in a predetermined cycle, and the second operational value CQ corresponding to the larger-or-smaller relation to the first operational value CQmax can be stored in the RAM 95.

Then at Step 104 in FIG. 20, the compensating factor C is calculated according to the first operational value CQmax and the second operational value CQ, and at Step 105, the substantial air flow Q* which has been compensated by multiplying this compensating factor C by the instant air flow Q is calculated.

FIG. 22 is a time chart showing the case where the air flow is rapidly increased or decreased in the air flow sensor 1, and at the time t0, the throttle valve 3 is rapidly opened and the opened state (large flow state) is maintained, and then at the time t3, the throttle valve 3 is rapidly brought into the closed state. The full line in FIG. 22(a) designates change of the actual intake air flow Q, and the broken line designates change of the instant intake air flow Q shown by the air flow sensor 1. In other words, after the output Q from the air flow sensor 1 is changed by the response characteristic of the sensor itself, at point A (time t1), its responsiveness is reduced according to the temperature characteristic of the alumina substrate 14 as shown in FIG. 2, which causing time lag until the time t2 at which a signal showing the actual air flow can be obtained. Time being spend in t1 to t2 ranges from several hundreds msec to 1 sec, which is considerably longer than the time 50 msec spent in the time t0 to t1. In response to the output Q from the air flow sensor 1, the first operational value CQmax changes as shown in the broken line in FIG. 22(b), and as the result of the operation shown in FIG. 21, the second operational value CQ also changes as shown in the full line in FIG. 22(b). Consequently, the compensating factor C is varied corresponding to the deviation of the first operational value CQmax and the second operational value CQ as shown in FIG. 22(c), and by multiplying the compensating factor C by the output Q from the air flow sensor 1, there can be obtained a signal showing the intake air flow Q* approximate to the actual intake air flow Q.

As can be seen from the above description, the first operational value CQmax being generated in the equilibrium state of the output of the air flow sensor 1 has been stored in advance, and there is formed the second operational value CQ which is changed corresponding to the change of the first operational value CQmax and the larger-or-smaller relation to the first operational value CQmax, and according to those operational values, the compensating factor C is calculated so as to be compensated by multiplying the compensating factor C by the output of the air flow sensor 1. In such an arrangement there are advantages that thermal effect caused by the holding member for holding the resistance of temperature dependency can be eliminated and that the response characteristic when the air flow is detected can be improved.

In the internal combustion engine employing such air flow sensor 1, where surging flow is generated in the intake air flow by blowing back from the internal combustion engine when the throttle opening is so wide as to have high load, there is a possibility that error may be produced between the surging flow average value and the sensor output average value as shown in FIG. 24. This is because the time constant of the temperature distribution of the alumina substrate 14 in the air flow sensor 1 is large enough compared with the surging flow, however, the time constant of the platinum resistance $R_H$ when it is cooled is greatly different from that when it is heated. As a result, when the surging flow is generated to have high load, linearity between the pressure in suction pipe and the intake air flow will be lost and, then, there is a disadvantage of producing error in the air fuel ratio and such bad effect as reduction of output. In order to remove such disadvantage caused by such surging flow as described above, in the present invention, it is arranged that the compensating operation is carried out with the instant output of the air flow sensor 1. In other words, where air flow is stationary the surging flow in the high load running area in the internal combustion engine as shown in FIG. 24, the first and the second operational values CQmax and CQ to the variation of the instant air flow Q are calculated, while the compensating factor C is calculated. And by multiplying this compensating factor C by the instant air flow Q, the substantial air flow Q* can be calculated and the intake air flow corresponding to the surging flow can be detected.

As a result, the linearity between the pressure in suction pipe and the intake air flow can be maintained and such bad effect caused by the error in air fuel ratio as reduction of output can be prevented.

In such first through fifth embodiments as described above, the first operational value is adapted to be set according to the output of the output of the air flow sensor 1 in advance, however, this first operational value is just the value corresponding to the air flow, then, the first operational value may be calculated according to both of the boost value which is used as a parameter showing the air flow in the internal combustion engine and the engine speed, or both of the opening degree of the throttle valve and the engine speed. In addition, in the first through fifth embodiments, the flow value of the thermal type air flow sensor is adapted to be compensated, however, there may be adapted to employ the output value of the air flow sensor or its analogue-to-digital converted value. Furthermore, in the first through fifth embodiments, the first operational value has been adapted to be set in advance in response to the output from the air flow sensor 1, however, this first operational value is just the value corresponding to the air flow, then, it may be adapted that the first operational value is calculated according to both of the boost value which is employed as a parameter showing the air flow in the internal combustion engine and the engine speed, or both of the opening degree of the throttle valve and the engine speed. And in those embodiments, there has been described on the air flow sensor in the internal combustion engine as an example of the thermal type air flow sensor, however, there may be employed a thermal type air flow sensor in which the temperature or temperature distribution of the resistance of temperature dependency and its holding member are deviated from the equilibrium value of the flow according to the flow change of fluid and which generates error in the flow characteristic, and this arrangement may be applicable to an EGR flow sensor of the internal combustion engine, for example.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

What is claimed is:

1. A method of processing a signal from a flow sensor so as to provide an accurate fluid flow reading, the method comprising the steps of:
   providing a thermal type flow sensor having a temperature-dependent resistance;
   detecting an output of said provided thermal type flow sensor, the output representing fluid flow;
   determining, in accordance with the output from the thermal type flow sensor, a first value representing fluid flow;
   determining a second value, representing a temperature characteristic of the thermal type flow sensor, in accordance with the determined first value;
   reading, as a third value, a value which corresponds to the second value and which was previously stored in memory;
   determining a correction factor based on said determined second value and said read third value;
   determining a corrected fluid flow value based on said first value and said determined correction factor;
   adjusting the fluid flow detected by said thermal type flow sensor in accordance with the determined corrected fluid flow value so as to provide an accurate fluid flow reading for said thermal type flow sensor; and
   controlling a fuel injection system of an internal combustion engine in accordance with the provided accurate fluid flow reading.

2. The method defined in claim 1, wherein said read third value is initially set such that the third value equals the first value when said flow sensor senses a steady-state of flow.

3. The method as defined in claim 1, further comprising the steps of comparing the read third value with the determined second value, providing an output representing a result of said comparing step, correcting the read third value in accordance with said comparing result output, and storing said corrected third value.

4. The method as defined in claim 3, wherein said step of correcting the read third value includes one of an addition and a subtraction operation.

5. The method as defined in claim 4, wherein said step of correcting the read third value includes adding a difference value representing a difference between the second value and the read third value.

6. The method as defined in claim 4, wherein said step of correcting the read third value includes subtracting a difference value representing a difference between the second value and the read third value.

7. The method as defined in claim 1, further comprising the step of detecting a revolution speed of said internal combustion engine, and wherein the second value is determined in accordance with the first value and the detected revolution speed.

8. The method as defined in claim 1, wherein said step of determining a corrected fluid flow value includes multiplying said first value by the determined correction factor.

9. The method as defined in claim 8, further comprising the step of setting maximum and minimum limit values for the correction factor.

10. The method as defined in claim 9, further comprising the steps of employing, as the correction factor, the maximum limit value when the determined correction factor is greater than the maximum limit value, and employing, as the correction factor, the minimum limit value when the determined correction factor is less than the minimum limit value.

11. The method as defined in claim 1, wherein said step of determining a corrected fluid flow value is performed only when a difference between the second and third values is greater than a predetermined value.

* * * * *

(12) REEXAMINATION CERTIFICATE (4348th)
United States Patent
Nishimura et al.

(10) Number: US 5,301,126 C1
(45) Certificate Issued: May 15, 2001

(54) METHOD OF PROCESSING A SIGNAL FROM A THERMAL TYPE FLOW SENSOR

(75) Inventors: Yukinobu Nishimura; Nobutake Taniguchi; Setsuhiro Shimomura, all of Himeji; Kouji Tanimoto, Amagasaki, all of (JP)

(73) Assignee: Mitsubishi Denki Kabushiki Kaisha, Tokyo (JP)

Reexamination Request:
No. 90/004,904, Jan. 26, 1998

Reexamination Certificate for:
Patent No.: 5,301,126
Issued: Apr. 5, 1994
Appl. No.: 07/849,812
Filed: Mar. 11, 1992

Related U.S. Application Data

(63) Continuation of application No. 07/479,821, filed on Feb. 13, 1990, now abandoned.

(30) Foreign Application Priority Data

| Feb. 14, 1989 | (JP) | 1-34391 |
| Mar. 24, 1989 | (JP) | 1-72617 |
| Mar. 24, 1989 | (JP) | 1-72618 |
| Apr. 28, 1989 | (JP) | 1-111109 |
| Apr. 28, 1989 | (JP) | 1-111110 |

(51) Int. Cl.$^7$ ............ G05D 7/00; G06F 15/20; G01N 11/04; F02D 41/30
(52) U.S. Cl. ............ 702/45; 702/53; 702/85; 702/100; 702/104; 73/118.2; 73/204.11; 73/204.14; 23/445; 23/339.12; 23/339.14; 23/339.24; 701/103; 701/108; 123/391; 123/340
(58) Field of Search ............ 702/45, 53, 85, 702/100, 104; 73/118.2, 204.11, 204.14; 123/445, 339.12, 339.14, 339.24

(56) References Cited

U.S. PATENT DOCUMENTS

| 4,418,568 | * | 12/1983 | Surman | 73/202.5 |
| 4,449,401 | * | 5/1984 | Kaiser et al. | 73/202.5 |
| 4,523,284 | * | 6/1985 | Amano et al. | 701/115 |
| 4,576,039 |   | 3/1986 | Muto et al. | 73/118.2 |
| 4,669,301 |   | 6/1987 | Kratt et al. | 73/118.2 |
| 5,317,910 | * | 6/1994 | Steinbrenner et al. | 73/118.2 |
| 5,750,889 | * | 5/1998 | Kowatari et al. | 73/118.2 |

FOREIGN PATENT DOCUMENTS

| 3535642 | 7/1986 | (DE) . |
| 0218232 | 4/1987 | (EP) . |

* cited by examiner

*Primary Examiner*—Thomas Peeso

(57) ABSTRACT

A method of processing signal for a thermal type flow sensor having a temperature dependence resistance employing platinum and the like and a holding member made of alumina for holding it so as to compensate for response delay when fluid flow is changed, in which, when the fluid flow is maintained in a stationary state, the so-called equilibrium state, by steps of setting in advance the relation between a flow related value which changes according to flow change and a first operational value showing the temperature characteristic of the holding member which changes according to flow so as to make the flow related value as a parameter, calculating the first operational value from the flow related value when flow is detected in accordance with the predetermined relation, comparing the calculated first operational value with the second operational value which is set in relation with the first operational value, correcting the second operational value so that it approximates the first operational value according to the compared result, calculating a compensating factor by a predetermined operational formula with the calculated first operational value and the corrected second operational value, and compensating the compensating factor by multiplying it by the detected flow.

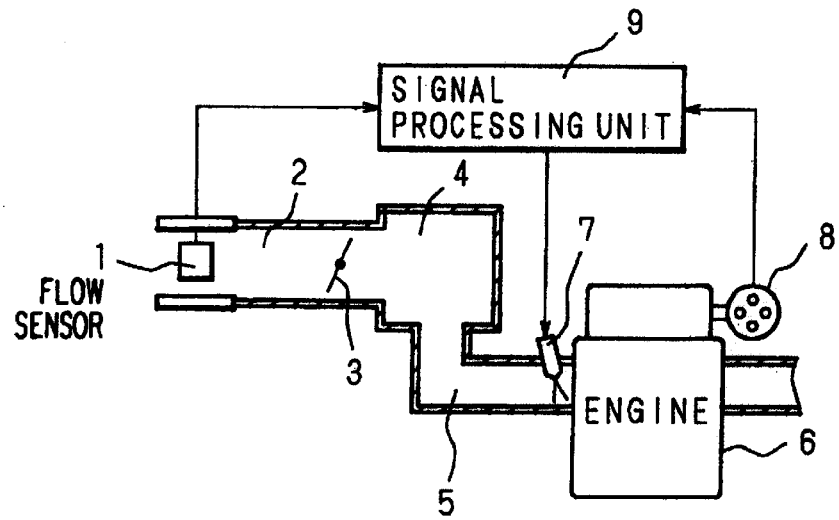

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–11 is confirmed.

* * * * *